(12) United States Patent
Kang

(10) Patent No.: US 12,298,385 B2
(45) Date of Patent: May 13, 2025

(54) APPARATUS AND METHOD FOR MONITORING SURROUNDING ENVIRONMENT OF VEHICLE

(71) Applicant: HYUNDAI MOBIS Co., Ltd., Seoul (KR)

(72) Inventor: Eun Seok Kang, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 411 days.

(21) Appl. No.: 17/825,745

(22) Filed: May 26, 2022

(65) Prior Publication Data
US 2022/0390593 A1    Dec. 8, 2022

(30) Foreign Application Priority Data

May 27, 2021 (KR) .................. 10-2021-0068397

(51) Int. Cl.
| | | |
|---|---|---|
| *G01S 13/89* | (2006.01) | |
| *G01S 13/93* | (2020.01) | |
| *G01S 13/931* | (2020.01) | |

(52) U.S. Cl.
CPC ............ *G01S 13/89* (2013.01); *G01S 13/931* (2013.01)

(58) Field of Classification Search
CPC ........ G01S 13/89; G01S 13/931; G01S 13/42; G01S 13/56; G01S 2013/9327; B60W 40/02; B60W 40/10; B60W 2050/0026; B60W 2050/0057; B60W 2520/10; B60W 2554/20; B60W 2555/20; B60Y 2400/3017
See application file for complete search history.

(56) References Cited

U.S. PATENT DOCUMENTS

| | | | |
|---|---|---|---|
| 2014/0071240 A1 | 3/2014 | Chen et al. | |
| 2017/0269201 A1* | 9/2017 | Adachi | ............... G01S 13/931 |
| 2020/0183011 A1* | 6/2020 | Lin | .................. G05D 1/0088 |
| 2021/0018615 A1* | 1/2021 | Su | ..................... G01S 13/726 |

FOREIGN PATENT DOCUMENTS

| | | |
|---|---|---|
| KR | 10-2013-0130843 A | 12/2013 |
| WO | 2020/257642 A1 | 12/2020 |

OTHER PUBLICATIONS

Extended European Search Report issued in corresponding European Patent Application No. 22174408.9 on Sep. 27, 2022.

* cited by examiner

*Primary Examiner* — Bernarr E Gregory
*Assistant Examiner* — Juliana Cross
(74) *Attorney, Agent, or Firm* — Morgan, Lewis & Bockius LLP

(57) ABSTRACT

An apparatus for monitoring the surrounding environment of a vehicle may include: a sensor unit including a plurality of detection sensors configured to detect an object outside the vehicle according to frames with a predefined period; and a control unit configured to extract a stationary object among outside objects detected through the sensor unit by using behavior information of the vehicle, map the extracted stationary object to a preset grid map, add occupancy information to each of grids constituting the grid map depending on whether the stationary object is mapped to the grid map, calculate an occupancy probability parameter indicating the probability that the stationary object will be located at each of the grids, from the occupancy information added to the grids within the grid map in a plurality of frames, and monitor the surrounding environment of the vehicle on the basis of the calculated occupancy probability parameter.

18 Claims, 25 Drawing Sheets

$K^{th}$ Frame

Before update error correction

After update error correction

FIG. 20

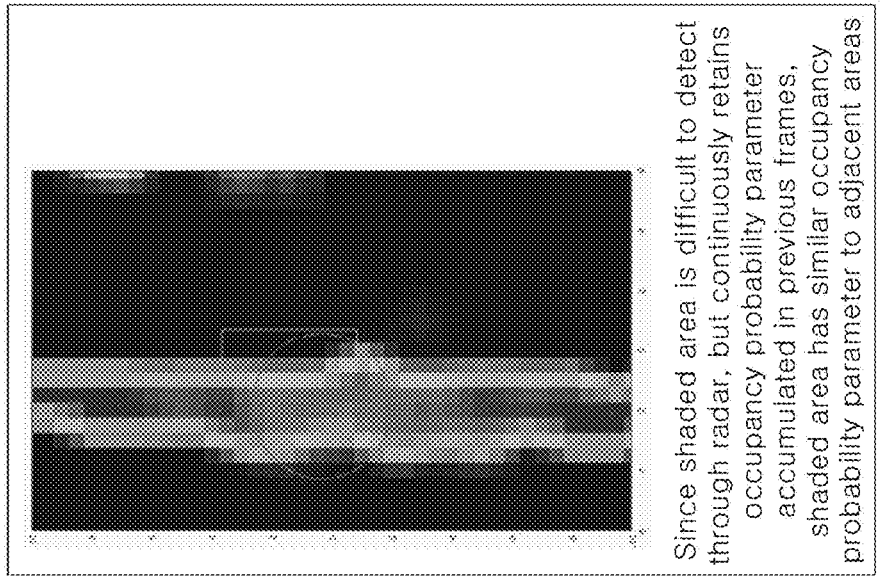

Since shaded area is difficult to detect through radar, detection probability for same stationary object gradually decreases, and thus shaded area has lower occupancy probability parameter than adjacent areas Before shaded area correction

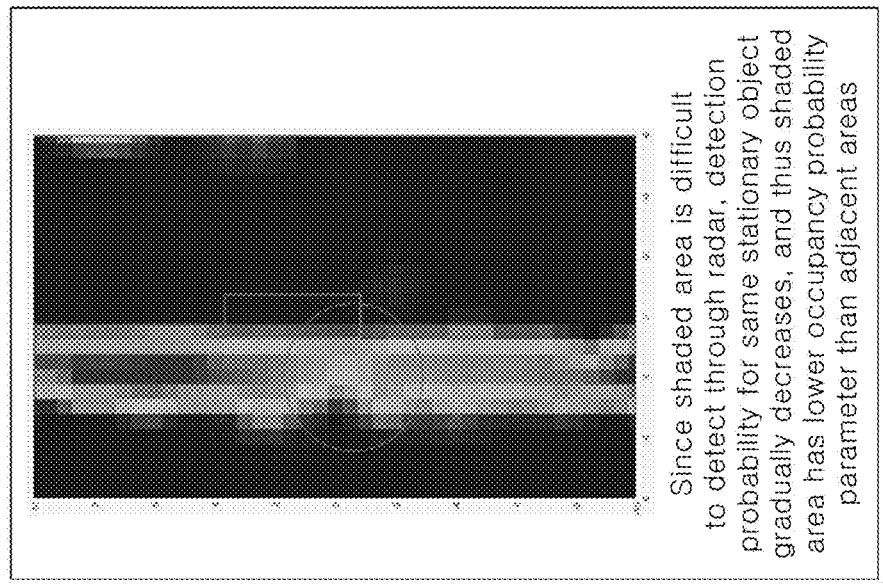

Since shaded area is difficult to detect through radar, but continuously retains occupancy probability parameter accumulated in previous frames, shaded area has similar occupancy probability parameter to adjacent areas After shaded area correction

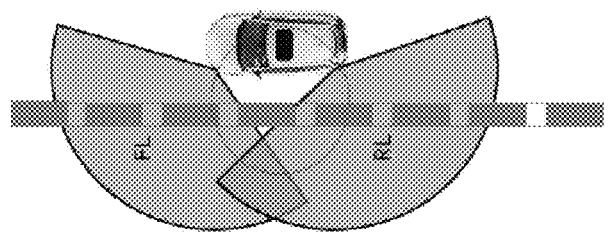

APPARATUS AND METHOD FOR MONITORING SURROUNDING ENVIRONMENT OF VEHICLE

CROSS-REFERENCE TO RELATED APPLICATION

This application claims priority from and the benefit of Korean Patent Application No. 10-2021-0068397, filed on May 27, 2021, which is hereby incorporated by reference for all purposes as if set forth herein.

BACKGROUND

Field

Exemplary embodiments of the present disclosure relate to an apparatus and method for monitoring the surrounding environment of a vehicle, and more particularly, to an apparatus and method for monitoring the surrounding environment of a vehicle by using an OGM (Occupancy Grid Map).

Discussion of the Background

A radar for a vehicle refers to a device that detects an outside object within a detection area when the vehicle travels, and warns a driver to help the driver to safely drive the vehicle. FIGS. 1A and 1B illustrate areas to which general radars for a vehicle transmit radar signals to detect an outside object. The radar for a vehicle operates to transmit a radar signal according to a frame with a predefined period, and detect an outside object. As illustrated in FIG. 1B, the signal characteristics of the transmitted radar signal, such as a waveform, frequency, distance resolution, angle resolution, maximum sensing distance, and FoV (Field of View), are different depending on a system of the vehicle, to which the radar is applied. Examples of the system include a DAS (Driver Assistance System) such as BSD (Blind Spot Detection), LCA (Lane Change Assistance), or RCTA (Rear Cross Traffic Alert).

The related art of the present disclosure is disclosed in Korean Patent Application Laid-Open No. 10-2013-0130843 published on Dec. 2, 2013.

SUMMARY

Various embodiments are directed to an apparatus and method for monitoring the surrounding environment of a vehicle, which can improve detection accuracy for an outside object when monitoring the surrounding environment of the vehicle through a radar.

In an embodiment, an apparatus for monitoring surrounding environment of a vehicle may include: a sensor unit including a plurality of detection sensors configured to detect an object outside the vehicle according to frames with a predefined period; and a control unit configured to: extract a stationary object among outside objects detected through the sensor unit by using behavior information of the vehicle, map the extracted stationary object to a preset grid map, add occupancy information to each of grids constituting the grid map depending on whether the stationary object is mapped to the grid map, calculate an occupancy probability parameter indicating a probability that the stationary object will be located at each of the grids from the occupancy information added to the grids within the grid map in a plurality of frames to be monitored, and monitor the surrounding environment of the vehicle on a basis of the calculated occupancy probability parameter.

The grid map may have a threshold value defined for each of the grids on a basis of a mathematical model according to an intensity of a received signal inputted to the sensor unit, the threshold value being used to decide whether the stationary object occupies each of the grids within the grid map.

The threshold value may have different values for an independent area, a single-overlap area, and a multi-overlap area within the grid map. The independent area may be an area within the grid map, sensed by a first detection sensor in a $K^{th}$ frame, where K is a natural number, the single-overlap area may be an area within the grid map, where an area sensed by the first detection sensor and the independent area overlap each other in a $(K+1)^{th}$ frame distinguished from the $K^{th}$ frame, and the multi-overlap area may be an area within the grid map, where an area sensed by a second detection sensor adjacent to the first detection sensor and the single-overlap area overlap each other in the $K^{th}$ frame or the $(K+1)^{th}$ frame.

The grid map may include a longitudinal axis, a horizontal axis, and indexes, which are set on the basis of the vehicle, and the control unit may be further configured to map the extracted stationary object to the grid map while updating the grid map by changing respective indexes of the grids constituting the grid map according to the behavior information of the vehicle.

The control unit may be further configured to: update the grid map when a longitudinal moving distance of the vehicle is larger than a longitudinal size of the grid or a horizontal moving distance of the vehicle is larger than a horizontal size of the grid, during a period from a $(K-1)^{th}$ frame to the $K^{th}$ frame, and change the respective indexes of the grids in the $(K-1)^{th}$ frame from those in the $K^{th}$ frame, on a basis of the longitudinal moving distance, the horizontal moving distance, and a longitudinal angle change of the vehicle.

The control unit may be further configured to: convert location information of the extracted stationary object into an index corresponding to the grid map, map the extracted stationary object to the grid map by specifying a target grid on the grid map, corresponding to the index, adds occupancy information with a first value to the target grid to which the stationary object is mapped, and add occupancy information with a second value to the other grids, the second value being smaller than the first value.

The control unit may be further configured to: decide an expanded mapping area which is expanded by a preset range on a basis of the target grid to which the stationary object is mapped, and calculate the occupancy probability parameter by adding the first occupancy information with the first value to each of grids constituting the expanded mapping area, in order to monitor the surrounding environment of the vehicle.

When the grid map is updated as the $(K-1)^{th}$ frame is switched to the $K^{th}$ frame, the control unit may be further configured to correct respective occupancy probability parameters of grids constituting a second expanded mapping area by comparing a first expanded mapping area in the $(K-1)^{th}$ frame to the second expanded mapping area in the $K^{th}$ frame.

The control unit may be further configured to: specify, among the grids of the second expanded mapping area, a first area composed of grids whose occupancy probability parameters has increased in the $K^{th}$ frame over the $(K-1)^{th}$ frame, specify, among the grids of the first expanded mapping area, a second area composed of grids whose occupancy probability parameters has decreased in the $K^{th}$ frame over the $(K-1)^{th}$ frame and then correct the respective occupancy probability parameters of the grids constituting the second expanded mapping area in the $K^{th}$ frame by substituting the occupancy probability parameters of the second area with the occupancy probability parameters of the first area.

The control unit may be further configured to: decide a peak grid having the highest occupancy probability parameter among the grids within the expanded mapping area decided for the plurality of frames to be monitored, and determine that the stationary object is located at the peak grid, when the occupancy probability parameter of the peak grid is equal to or larger than a threshold value defined for the peak grid.

The control unit may be further configured to correct a shaded grid corresponding to a shaded area where the sensor unit is not able to detect an outside object in a $K^{th}$ frame, by using a first method of receiving an occupancy probability parameter of a grid in a $(K-1)^{th}$ frame corresponding to the shaded grid or a second method of receiving an occupancy probability parameter of a grid around the shaded grid.

The control unit may be configured to correct the shaded grid according to the first method when the speed of the vehicle is equal to or higher than a preset reference value, and correct the shaded grid according to the second method when the speed of the vehicle is lower than the reference value.

In an embodiment, a method for monitoring surrounding environment of a vehicle may include: extracting, by a control unit, a stationary object among objects outside the vehicle, detected by a sensor unit, by using behavior information of a vehicle, wherein the sensor unit includes a plurality of detection sensors for detecting the objects outside the vehicle according to frames with a preset period; mapping, by the control unit, the extracted stationary object to a preset grid map, adding, by the control unit, occupancy information to each of grids constituting the grid map depending on whether the extracted stationary object is mapped to the grid map, and calculating, by the control unit, an occupancy probability parameter indicating the probability that the stationary object will be located at each of the grids, from the occupancy information added to the grids within the grid map in a plurality of frames to be monitored; and monitoring, by the control unit, the surrounding environment of the vehicle on the basis of the calculated occupancy probability parameter.

In accordance with the embodiments of the present disclosure, the apparatus and method for monitoring the surrounding environment of a vehicle in accordance with the present embodiment may map a stationary object detected through the radar to the preset grid map, add occupancy information to each of the grids constituting the grid map depending on whether the stationary object is mapped to the grid map, and then calculate the occupancy probability parameter from the occupancy information added to each of the grids within the grid map in a plurality of frames to be monitored, the occupancy probability parameter indicating that the probability that the stationary object will be located at the corresponding grid, in order to monitor the surrounding environment of the vehicle. Thus, the apparatus and method can improve the detection accuracy for the outside object when monitoring the surrounding environment of the vehicle through the radar.

BRIEF DESCRIPTION OF THE DRAWINGS

FIGS. 17 to 20 are diagrams illustrating a process of correcting a shaded grid in the apparatus for monitoring the surrounding environment of a vehicle in accordance with the embodiment of the present disclosure.

DETAILED DESCRIPTION OF THE ILLUSTRATED EMBODIMENTS

Hereinafter, n apparatus and method for monitoring the surrounding environment of a vehicle will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
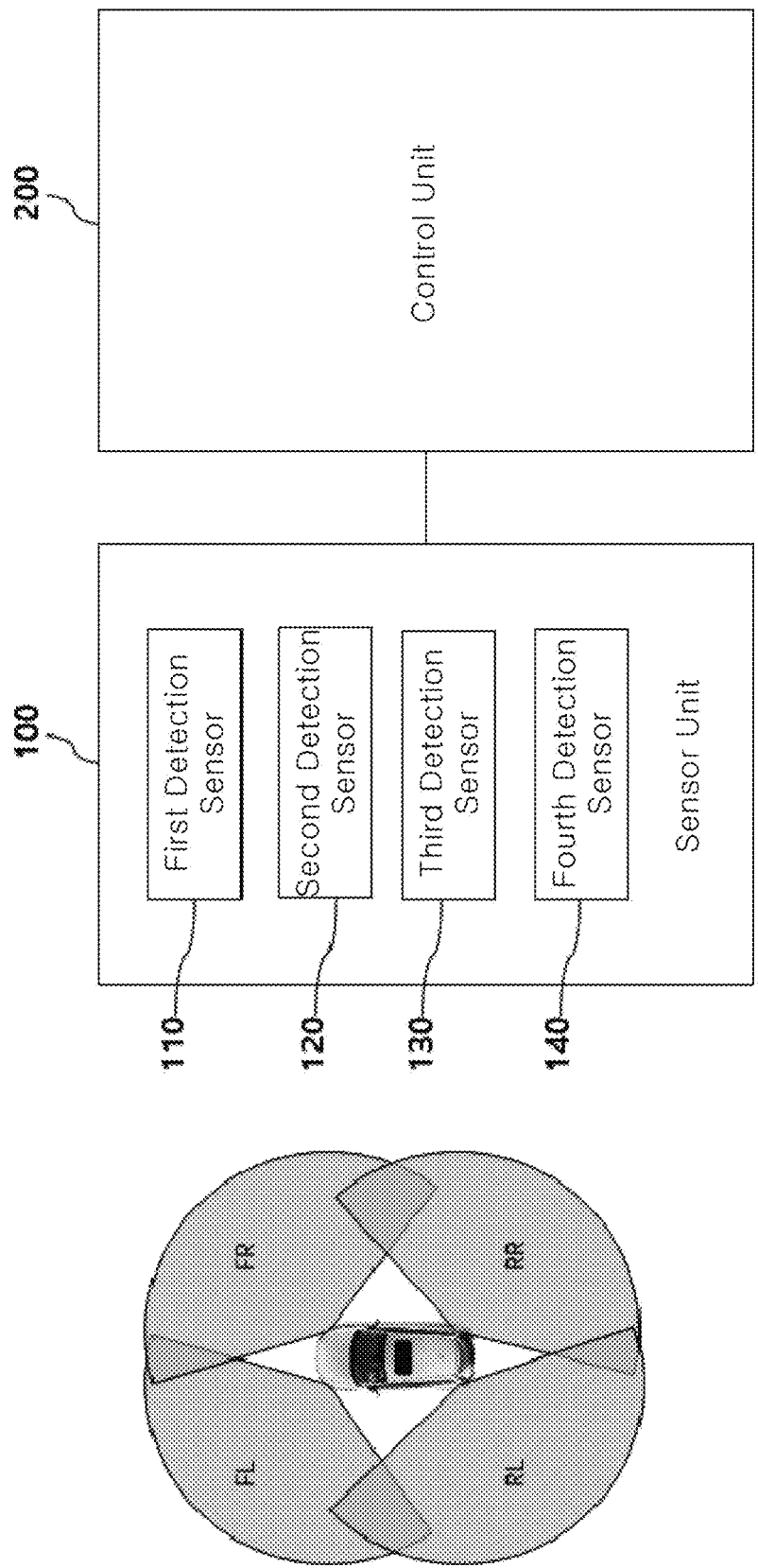
FIG. 2 is a block configuration diagram for describing an apparatus for monitoring the surrounding environment of a vehicle in accordance with an embodiment of the present disclosure.
Figure 3:
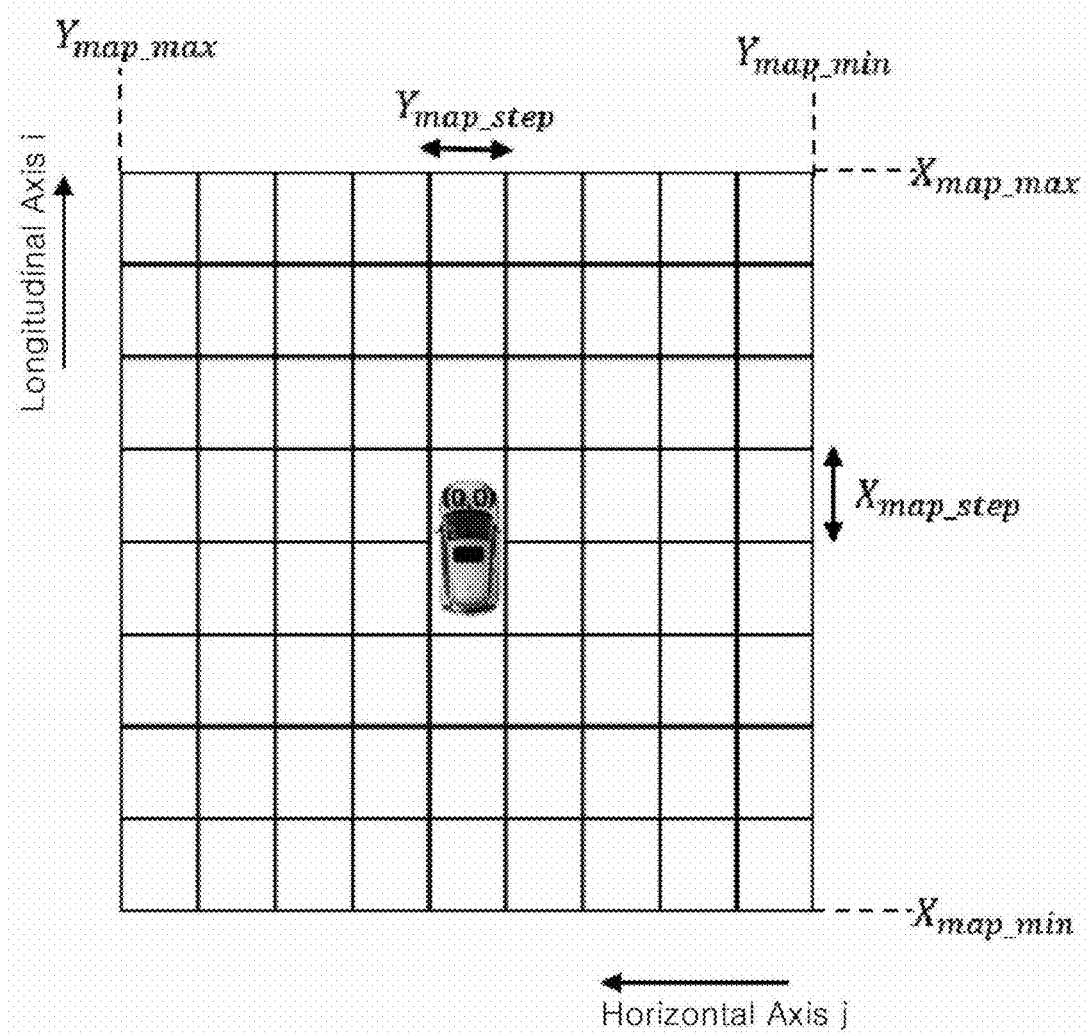
FIG. 3 is a diagram illustrating a grid map in the apparatus for monitoring the surrounding environment of a vehicle in accordance with the embodiment of the present disclosure.
Figure 9A:
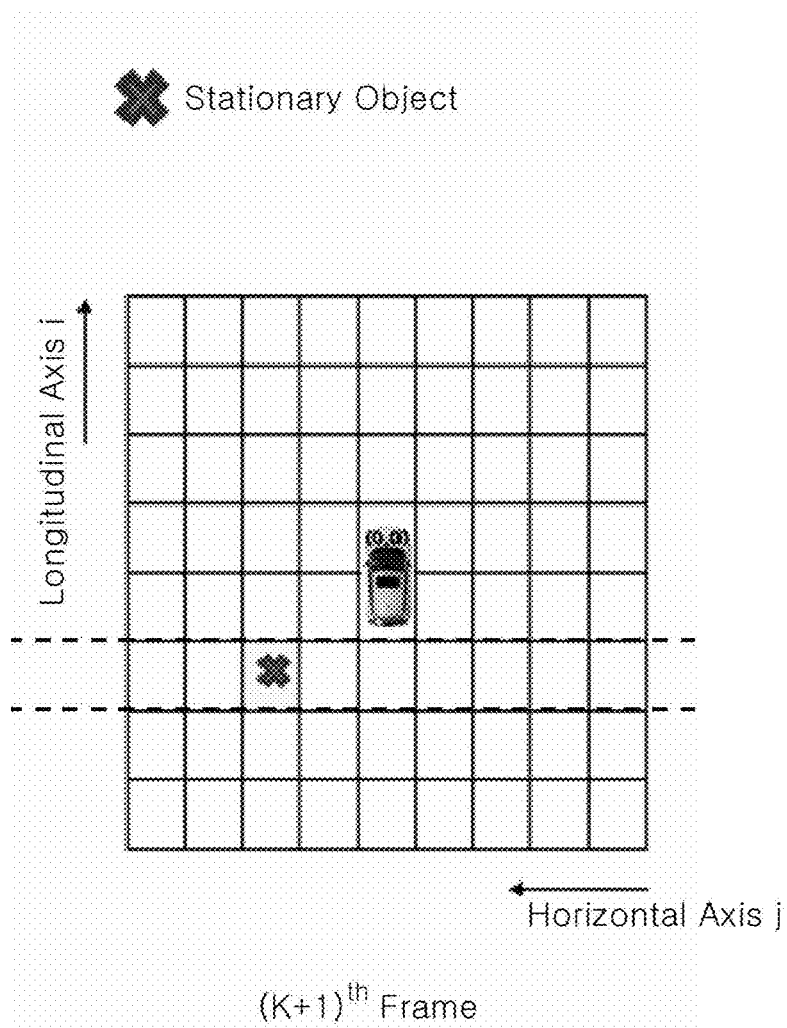
FIGS. 9A to 9C and 10 are diagrams illustrating a process of updating the grid map in the apparatus for monitoring the surrounding environment of a vehicle in accordance with the embodiment of the present disclosure.
Figure 9B:
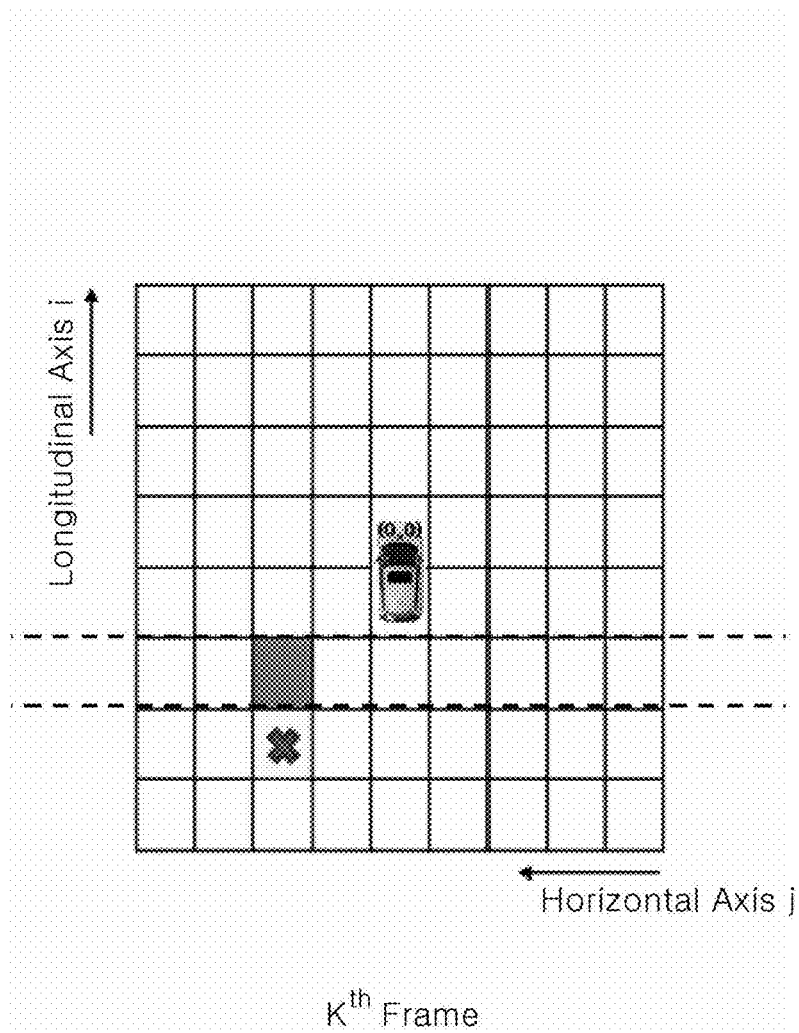
Figure 9C:
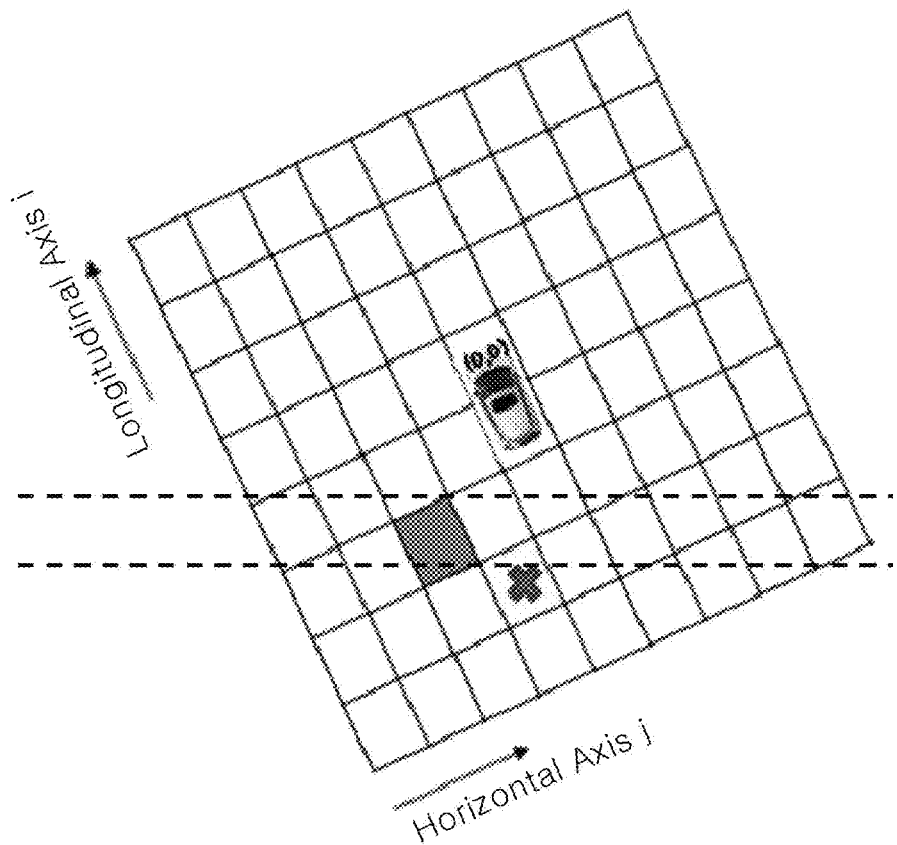
Figure 10:
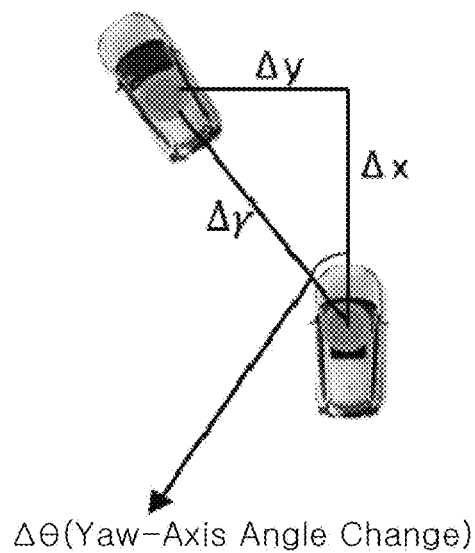
Figure 11:
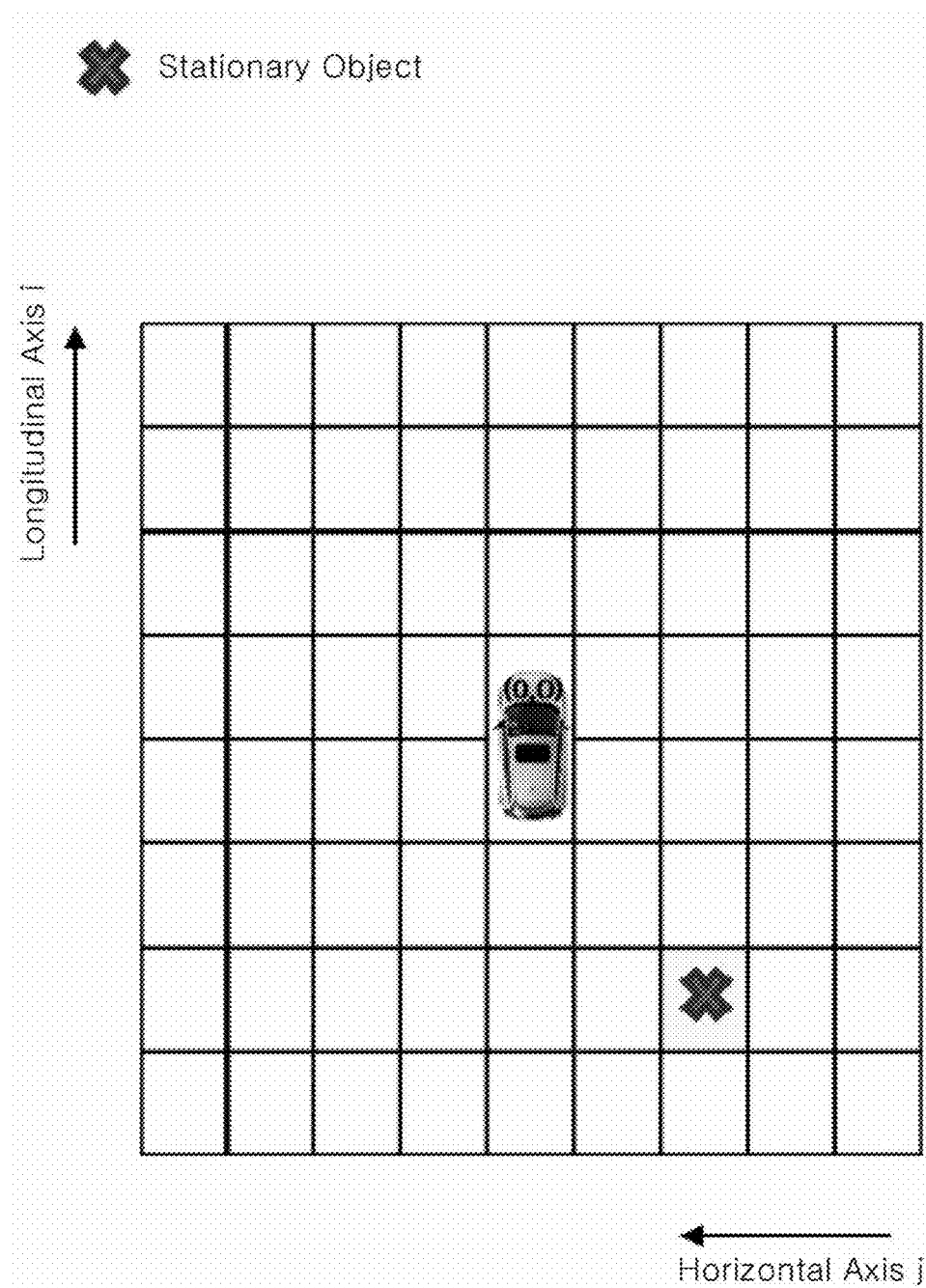
FIG. 11 is a diagram illustrating a process of mapping a stationary object to the grid map in the apparatus for monitoring the surrounding environment of a vehicle in accordance with the embodiment of the present disclosure.
Figure 12:
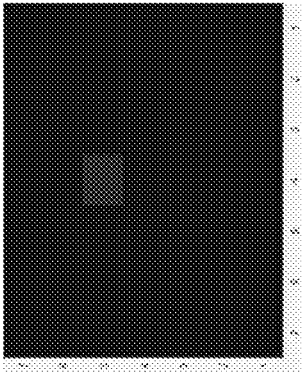
FIGS. 12 to 14 are diagrams illustrating a process of deciding an expanded mapping area in the apparatus for monitoring the surrounding environment of a vehicle in accordance with the embodiment of the present disclosure.
Figure 13:
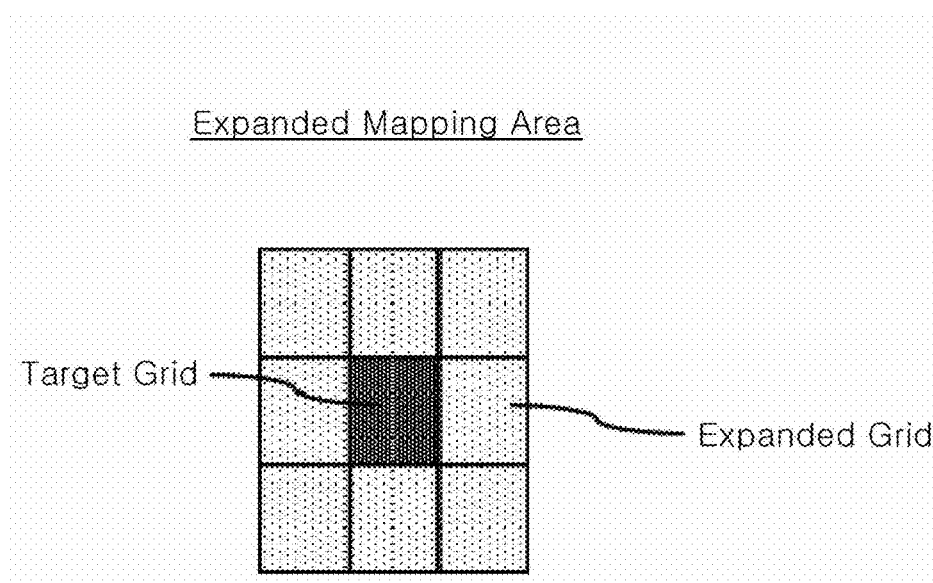
Figure 14:
Figure 15:
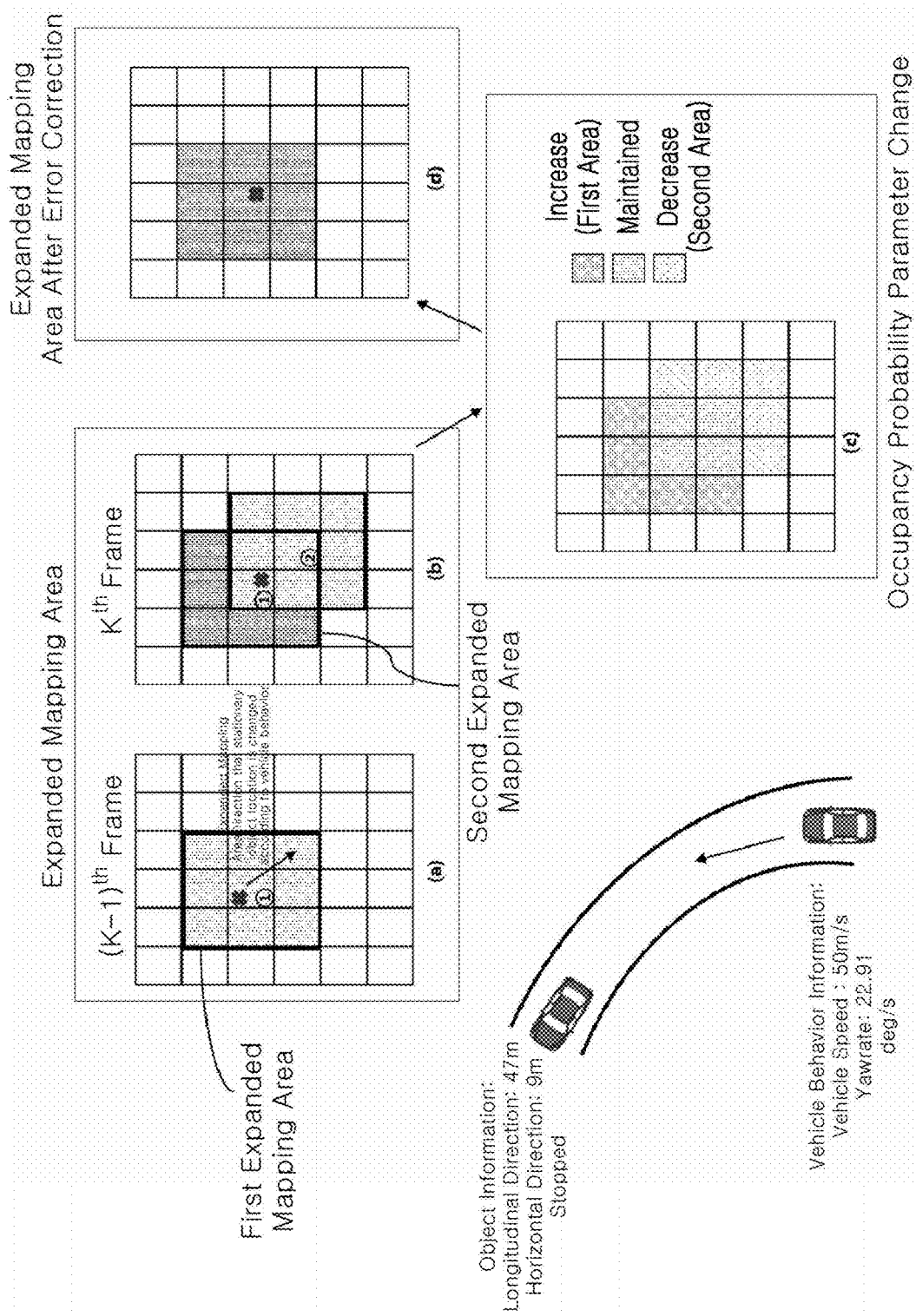
FIGS. 15, 16A, and 16B are diagrams illustrating a process of correcting an occupancy probability parameter in the apparatus for monitoring the surrounding environment of a vehicle in accordance with the embodiment of the present disclosure.

FIG. 2 is a block configuration diagram for describing an apparatus for monitoring the surrounding environment of a vehicle in accordance with an embodiment of the present disclosure, FIG. 3 is a diagram illustrating a grid map in the apparatus for monitoring the surrounding environment of a vehicle in accordance with the embodiment of the present disclosure, FIGS. 4 to 8 are diagrams illustrating a process of setting threshold values of the grid map in the apparatus for monitoring the surrounding environment of a vehicle in accordance with the embodiment of the present disclosure, FIGS. 9 and 10 are diagrams illustrating a process of updating the grid map in the apparatus for monitoring the surrounding environment of a vehicle in accordance with the embodiment of the present disclosure, FIG. 11 is a diagram illustrating a process of mapping a stationary object to the grid map in the apparatus for monitoring the surrounding environment of a vehicle in accordance with the embodiment of the present disclosure, FIGS. 12 to 14 are diagrams illustrating a process of deciding an expanded mapping area in the apparatus for monitoring the surrounding environment of a vehicle in accordance with the embodiment of the present disclosure, FIGS. 15 and 16 are diagrams illustrating a process of correcting an occupancy probability parameter in the apparatus for monitoring the surrounding environment of a vehicle in accordance with the embodiment of the present disclosure, and FIGS. 17 to 20 are diagrams illustrating a process of correcting a shaded grid in the apparatus for monitoring the surrounding environment of a vehicle in accordance with the embodiment of the present disclosure.

Referring to FIG. 2, the apparatus for monitoring the surrounding environment of a vehicle in accordance with the embodiment of the present disclosure may include a sensor unit 100 and a control unit 200.

Figure 1A:
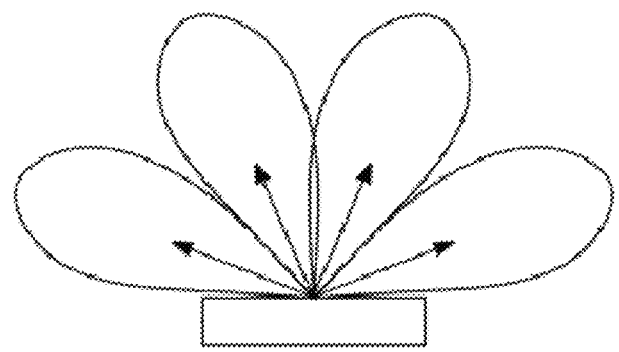
FIGS. 1A and 1B are diagrams illustrating areas to which general radars for a vehicle transmit radar signals to detect an outside object.
Figure 1B:
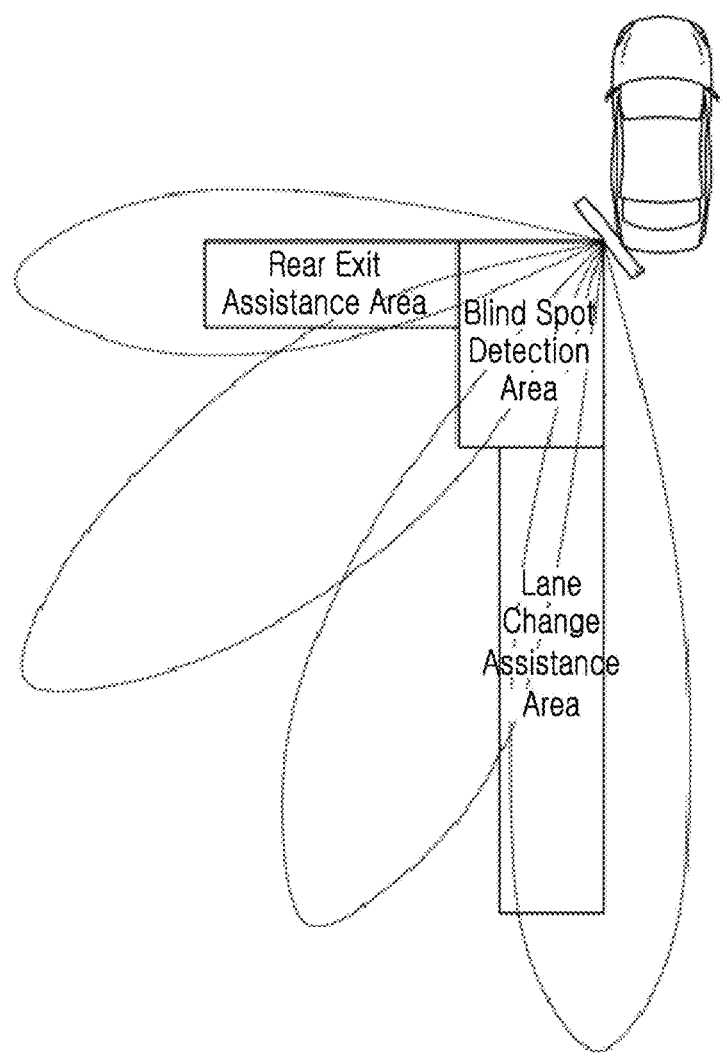

The sensor unit 100 may include first to fourth detection sensors 110, 120, 130, and 140 corresponding to radar sensors of the vehicle. As illustrated in FIG. 2, the first detection sensor 110 may correspond to a rear right (RR) radar sensor, the second detection sensor 120 may correspond to a rear left (RL) radar sensor, the third detection sensor 130 may correspond to a front right (FR) radar sensor, and the fourth detection sensor 140 may correspond to a front left (FL) radar sensor. Therefore, the detection sensors 110, 120, 130, and 140 may operate to detect an outside object through a method of transmitting a radar signal according to frames with a predefined period and receiving a signal reflected from the outside object. Furthermore, depending on a DAS (Driver Assistance System) (e.g. BSD, LCA or RCTA) to which a radar sensor is applied as illustrated in FIGS. 1A and 1B, the waveform, frequency, distance resolution, angle resolution, maximum sensing distance, and FoV of a radar signal transmitted from the radar sensor may have different characteristics for the respective frames.

The control unit 200 serves to monitor the surrounding environment of the vehicle by controlling an operation of the DAS of the vehicle, and may be implemented as an ECU (Electronic Control Unit), processor, CPU (Central Processing Unit) or SoC (System on Chip). The control unit 200 may drive an operating system or application to control a plurality of hardware components or software components connected to the control unit 200, and perform various data processing operations.

In the present embodiment, the control unit 200 may operate to extract a stationary object among outside objects detected by the sensor unit 100 by using behavior information of the vehicle, map the extracted stationary object to a preset grid map, and add occupancy information to each of grids constituting the grid map depending on whether the stationary object is mapped to the grid map. Furthermore, the control unit 200 may operate to calculate an occupancy probability parameter indicating the probability that the stationary object will be located at each of the grids, from the occupancy information added to the grids within the grid map in a plurality of frames to be monitored, and monitor the surrounding environment of the vehicle on the basis of the calculated occupancy probability parameter.

Hereafter, the process of monitoring the surrounding environment of the vehicle will be described in detail for each of the detailed operations of the control unit 200.

1. Stationary Object Extraction

First, the control unit 200 may extract a stationary object among outside objects detected by the sensor unit 100 by using behavior information of the vehicle and object information acquired on the basis of a result obtained by detecting the outside objects through the sensor unit 100. That is, the descriptions of the present embodiment will be focused on the configuration for monitoring a stationary object, not a moving object, among various outside objects around the vehicle.

The behavior information of the vehicle may include a vehicle speed, yaw rate, speed change information, and steering angle, and the object information may include the number of outside objects detected by the sensor unit 100, the longitudinal distance and horizontal distance to each of the objects, the longitudinal speed and horizontal speed of each of the objects, and the intensity of a received signal. The control unit 200 may extract only a stationary object among the outside objects by using the behavior information of the vehicle and the object information. For example, the control unit 200 may distinguish between a moving object and a stationary object by analyzing the relationships between the vehicle speed of the vehicle and the longitudinal/horizontal speeds of the objects, in order to extract only the stationary object.

2. Stationary Object Mapping

When the stationary object is extracted, the control unit 200 may map the extracted stationary object to the preset grid map. Before the mapping process for the stationary object, the grid map and an update process for the grid map will be preferentially described.

2-1. Grid Map

As illustrated in FIG. 3, the grid map may be set in the control unit 200 in advance, and have a size corresponding to the surrounding environment area of the vehicle, which is to be monitored. In FIG. 3, $X_{map\_max}$ represents the maximum distance in the longitudinal direction (the longitudinal size of the grid map), $Y_{map\_max}$ represents the maximum distance in the horizontal direction (the horizontal size of the grid map), $X_{map\_min}$ represents a longitudinal reference position of the grid map, $Y_{map\_min}$ represents a horizontal reference position of the grid map, $X_{map\_step}$ represents the longitudinal size of each grid, and $Y_{map\_step}$ represents the horizontal size of each grid.

The longitudinal and horizontal axes of the grid map may be set on the basis of the vehicle. If the longitudinal and horizontal axes of the grid map are set on the basis of a specific point, not the vehicle, more memory resources may be required depending on the mileage of the vehicle. Furthermore, it is effective to set, to the surrounding area of the vehicle, a surrounding environment monitoring area required for outputting a warning to a driver or performing a traveling control operation of the vehicle. Therefore, the longitudinal and horizontal axes of the grid map may be set on the basis of the vehicle. Thus, the indexes (coordinates (i, j)) of the grids constituting the grid map may also be set on the basis of the vehicle, where i and j represent the longitudinal and horizontal indexes, respectively.

Figure 4:
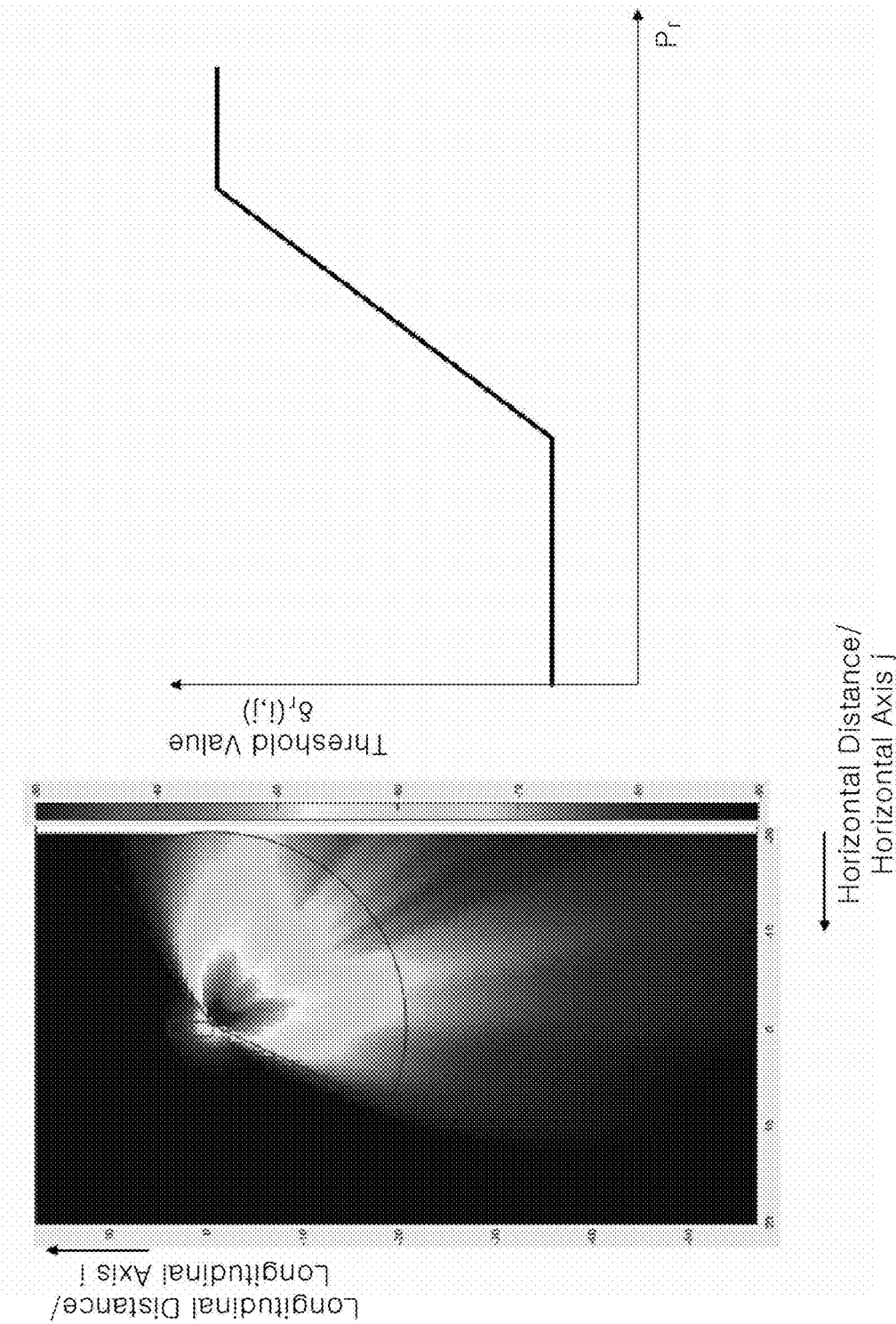
FIGS. 4 to 8 are diagrams illustrating a process of setting threshold values of the grid map in the apparatus for monitoring the surrounding environment of a vehicle in accordance with the embodiment of the present disclosure.

As illustrated in FIG. 4, a threshold value for deciding whether a stationary object occupies each of the grids within the grid map may be defined for the corresponding grid in the grid map. As will be described below, the threshold value functions as a value which is compared to an occupancy probability parameter, and serves as a reference value for determining whether the stationary object is located at the corresponding grid. The threshold value may be defined for each of the grids on the basis of a mathematical model according to the intensity of a received signal inputted to the sensor unit 100, and the mathematical model may correspond to a well-known radar equation below, where Pr represents the intensity of the received signal, Gt represents an antenna gain, and Rt represents the distance to the object:

$$P_r \propto G_{t,r}(\theta), \frac{1}{R_t^4}.$$

Specifically, according to the radar equation, the intensity of the received signal may differ depending on the antenna gain and the relative distance to the object. Therefore, the probability that the same object will be detected through the radar may differ depending on the location thereof. For example, when an object is located at a short distance, the intensity of a received signal is so high that the object detection probability increases, and when an object is located at a long distance, the intensity of a received signal is so low that the object detection probability decreases.

Furthermore, when an object is located at a location where the antenna gain is high, the intensity of a received signal is so high that the object detection probability increases, and when an object is located at a location where the antenna gain is low, the intensity of a received signal is so low that the object sensing detection decreases. As described above, the waveform, frequency, distance resolution, angle resolution, maximum sensing distance, and FoV of a radar signal transmitted from the radar may have different characteristics for the respective frames, depending on the DAS (e.g. BSD, LCA or RCTA) of the vehicle, to which the radar sensor is applied. Thus, each of the frames may include an area where an object can be repeatedly detected, and only a specific frame may include an area where an object can be detected. Therefore, the area which is repeated in each of the frames may have a high object detection probability, and the area which is not repeated in each of the frames may have a low object detection probability. That is because, during two frames, an object can be detected twice in an area which is repeated, but an object can be detected only once in an area which is not repeated.

Furthermore, for two adjacent radar sensors, for example, the RR radar sensor and the RL radar sensor, there may be an area where an object can be redundantly detected through the two radar sensors, and an area where an object can be detected only through one radar sensor. Therefore, the area where the object can be redundantly detected through the two radar sensors may have a high object detection probability, and the area where the object can be detected only through one radar sensor may have a low object detection probability. That is because, although one radar sensor does not detect the object in the area where the object can be redundantly detected through the two radar sensors, the object can be detected through the other adjacent radar sensor, but when one radar sensor does not detect the object in the area where the object can be detected only through one radar sensor, the object cannot be detected through the other adjacent radar sensor.

Through the above-described contents, two situations may be considered.

i) Case in which the object detection probability is the highest: an 'area where an object is located at a short distance and the antenna gain is high', a 'detection area repeated in each frame', and a 'detection area redundant between the adjacent radar sensors' i) Case in which the object detection probability is the lowest: an 'area where an object is located at a long distance and the antenna gain is high', a 'detection area which is not repeated in each frame', and a 'detection area which is not redundant between the adjacent radar sensors'

It may be unreasonable to set the same threshold value to all the grids, in order to decide whether a stationary object occupies each of the grids within the grid map, in the two above cases. That is because, in case (i), it may be falsely determined that an object is present, even though no object is actually present (false detection), and in case (ii), it may be falsely determined that no object is present, even though an object is actually present (missing detection). Thus, in the present embodiment, the threshold values for the respective grids may be differently set depending on the object detection probability, which makes it possible to prevent the false determination (false detection and missing detection).

Specifically, the threshold value may be set to different values for an independent area, a single-overlap area, and a multi-overlap area within the grid map.

Figure 5:
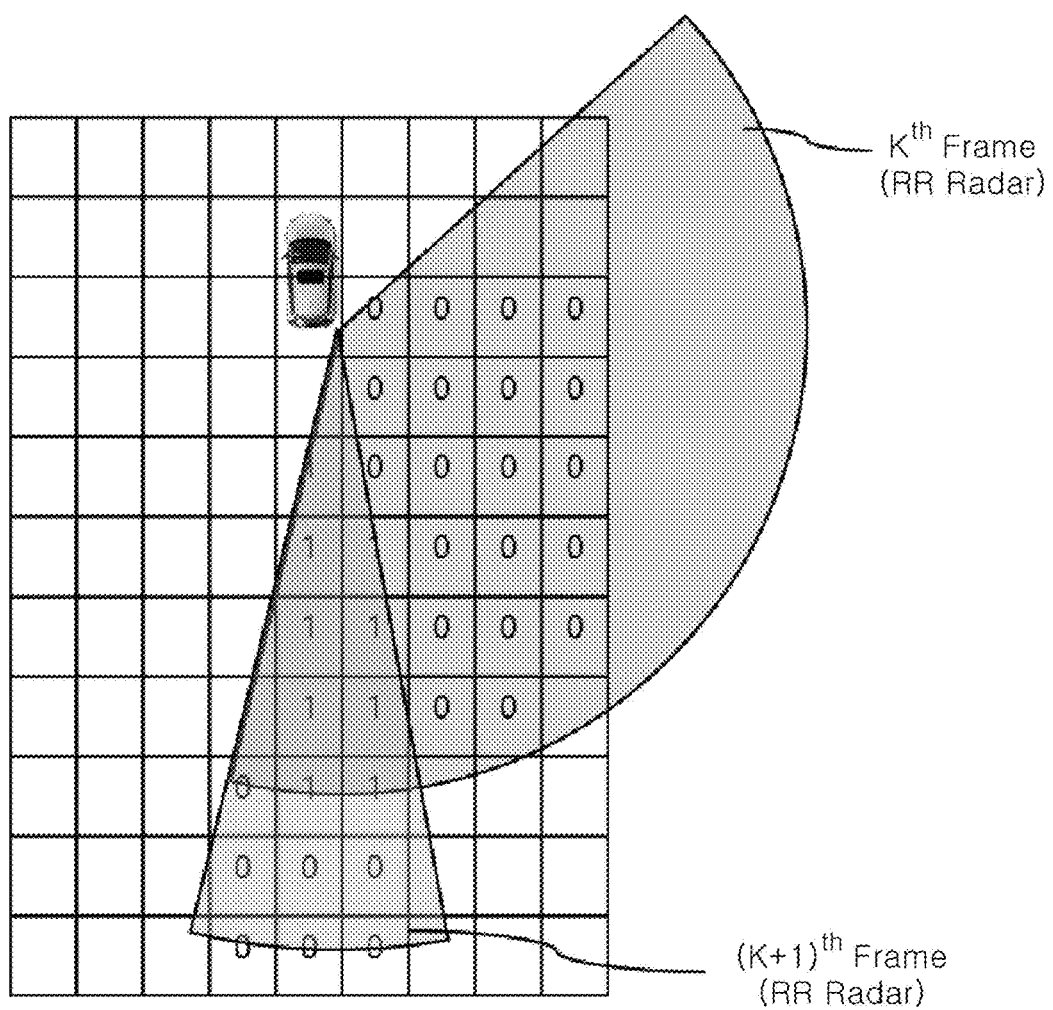

The independent area may be defined as an area within the grid map, which is sensed by the first detection sensor 110 in a $K^{th}$ frame, where K is a natural number, and the single-overlap area may be defined as an area within the grid map, in which an independent area and an area sensed by the first detection sensor 110 overlap each other in a $(K+1)^{th}$ frame distinguished from the $K^{th}$ frame (following the $K^{th}$ frame). That is, the independent area and the single-overlap area are distinguished from each other, according to whether the detection areas overlap each other for the same detection sensor in the respective frames. In FIG. 5 in which the first detection sensor is the RR radar, the grid of the independent area is designated by '0', and the grid of the single-overlap area is designated by '1'. The threshold value of the grid of the independent area may be set to a lower value than that of the grid of the single-overlap area, which makes it possible to compensate for false detection and missing detection which may occur for an object located in the independent area.

Figure 6:
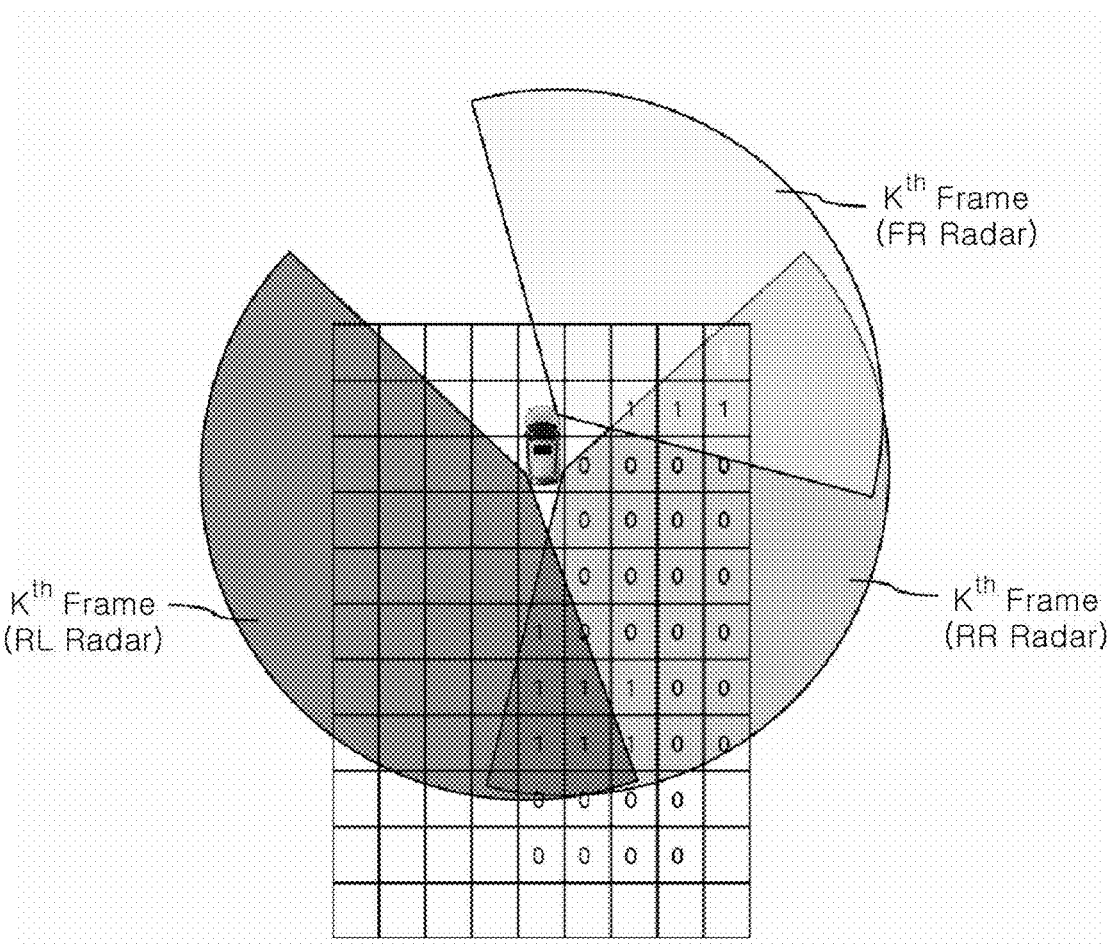
Figure 7:
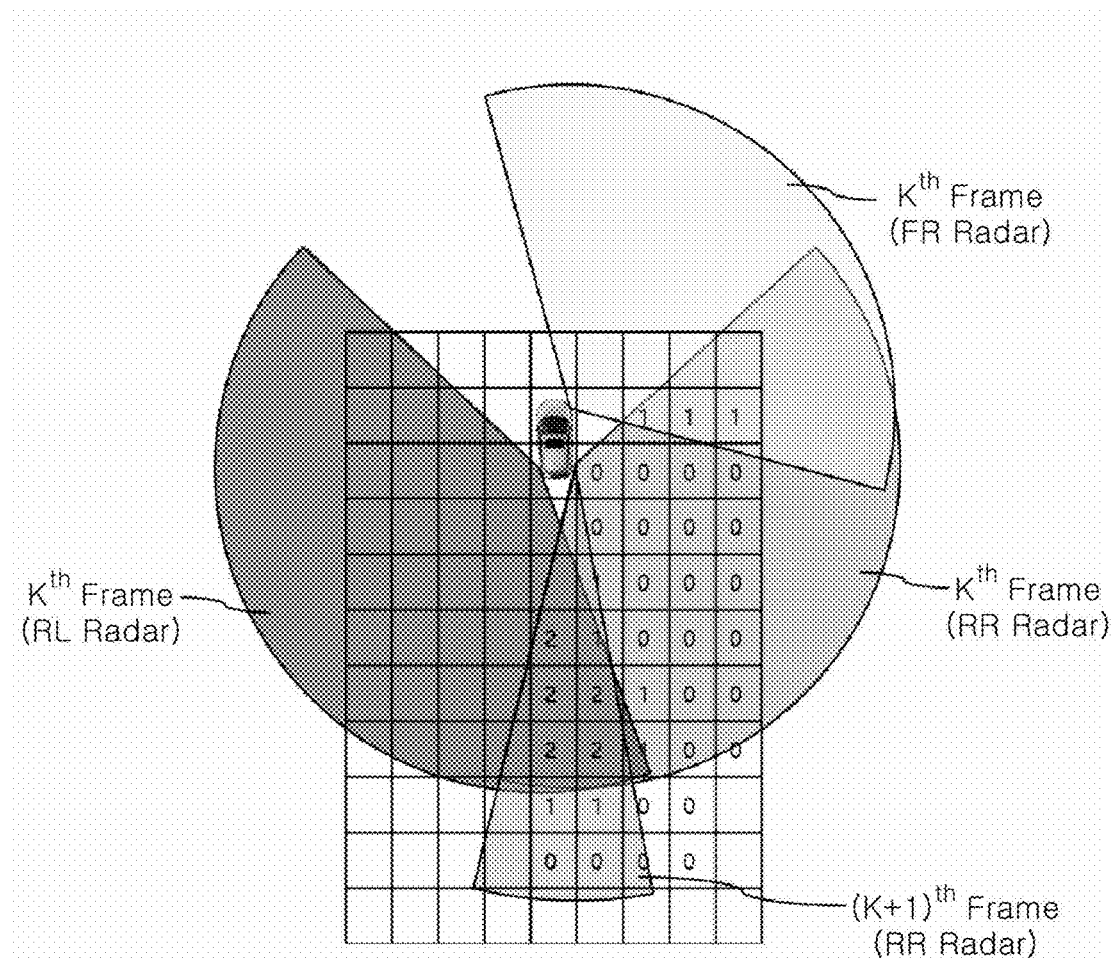
Figure 8:
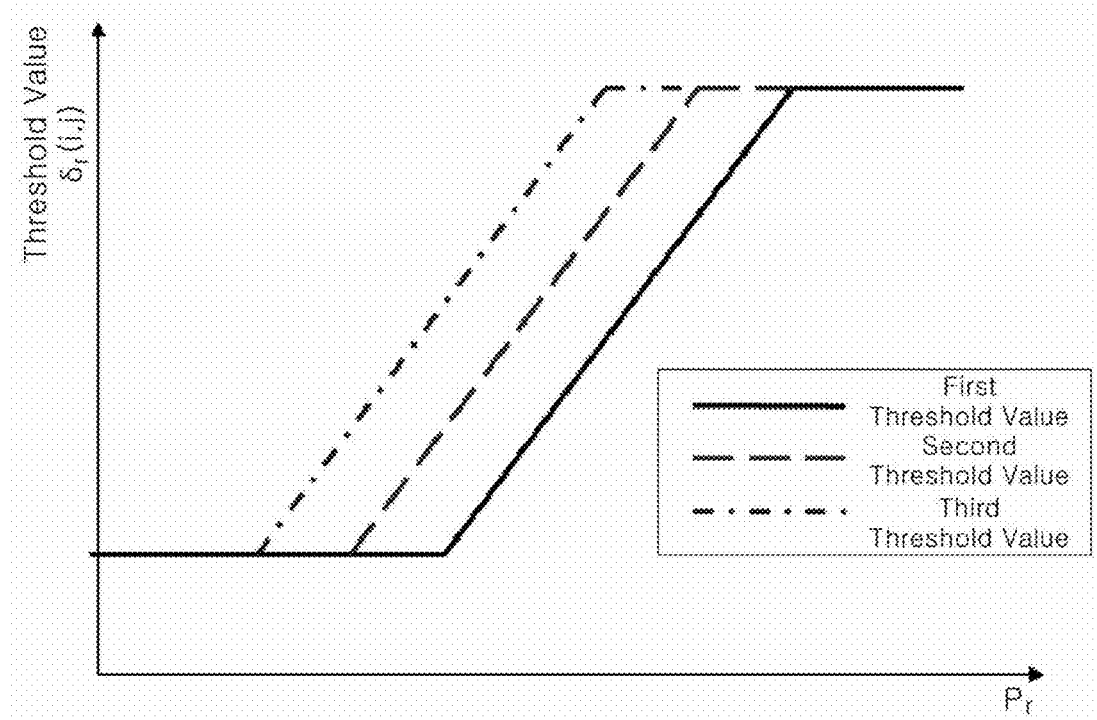

The multi-overlap area may be defined as an area within the grid map, in which an area sensed by the second detection sensor 120 adjacent to the first detection sensor 110 overlaps a single-overlap area in the same frame ($K^{th}$ or $(K+1)^{th}$ frame). That is, the multi-overlap area is decided according to whether areas detected by two adjacent detection sensors overlap each other in the same frame. In FIG. 6 in which the first detection sensor is the RR radar and the second detection sensor is the RL radar, the grid of an area sensed by the first detection sensor 110 is designated by '0', and the grid of the area where areas sensed by the first and second detection sensors 110 and 120 overlap each other is designated by '1'. Thus, as illustrated in FIG. 7 in which the first detection sensor is the RR radar and the second detection sensor is the RL radar, the grid map may be divided into the independent area '0' sensed by the first detection sensor 110 in the $K^{th}$ frame, the single-overlap area '1' which is an overlap area between the areas sensed by the first detection sensor 110 in the $K^{th}$ frame and the $(K+1)^{th}$ frame, and the multi-overlap area '2' which is an overlap area sensed by the first and second detection sensors 110 and 120 in the same frame and overlaps the single-overlap area. When the threshold values of the independent area, the single-overlap area, and the multi-overlap area are defined as a first threshold value, a second threshold value, and a third threshold value, respectively, a relationship of 'first threshold value<second threshold value<third threshold value' may be established in a section where the threshold values linearly increase as illustrated in FIG. 8.

2-2. Grid Map Update

As described above, since the longitudinal axis, horizontal index, and indexes of the grid map are set on the basis of the vehicle, the indexes of the grid map are changed by the behavior of the vehicle. Thus, a process of updating the grid map by changing the indexes of the grid map is needed in order to map a stationary object to the grid map. Furthermore, even after the stationary object is mapped to the grid map, the index of the grid to which the stationary object is mapped needs to be changed according to the behavior of the vehicle. When the grid map is updated after the stationary object is mapped to the grid map, the index of the grid to which the stationary object is mapped is also changed.

For this operation, the control unit 200 may update the grid map when a longitudinal moving distance of the vehicle is larger than the longitudinal size of the grid or a horizontal moving distance of the vehicle is larger than the horizontal size of the grid during a period from a $(K-1)^{th}$ frame to the $K^{th}$ frame. In this case, the control unit 200 may change the indexes of the respective grids in the $(K-1)^{th}$ frame from those in the $K^{th}$ frame, on the basis of the longitudinal moving distance, the horizontal moving distance, and a longitudinal angle change of the vehicle.

In order to take, as an example of a changed index, the index of a grid at which a stationary object is located, FIG. 9A illustrates the grid map in the $(K-1)^{th}$ frame with the index of the grid at which the stationary object is located. When the vehicle travels in the longitudinal direction by a distance larger than the longitudinal size of the grid as illustrated in FIG. 9B, the index of the stationary index on the grid map in the $(K-1)^{th}$ frame needs to be changed on the basis of the $K^{th}$ frame, because the index of the stationary object on the grid map in the $K^{th}$ frame is different from the index of the stationary object on the grid map in the $(K-1)^{th}$ frame. When the vehicle makes a turn according to a predetermined yaw rate as illustrated in FIG. 9C such that the longitudinal or horizontal moving distance of the vehicle becomes smaller than the longitudinal or horizontal size of the grid, the index of the stationary object on the grid map in the $(K-1)^{th}$ frame needs to be changed on the basis of the $K^{th}$ frame, because the index of the stationary object on the grid map in the $K^{th}$ frame is different from the index of the stationary object on the grid map in the $(K-1)^{th}$ frame. In this case, an angle change based on the yaw rate may be reflected into the update of the grid map.

The update process for the grid map based on FIGS. 9A to 9C will be described with reference to modeling of FIG. 10.

First, the control unit 200 calculates the accumulative values of yaw-axis angle changes and moving displacement changes of the vehicle during a period from the $(K-1)^{th}$ frame to the $K^{th}$ frame, according to Equation 1 below.

$$-\Delta\theta\_acc=\Delta\theta\_acc+\Delta\theta$$

$$-\Delta\gamma=Vs*dt=|\Delta\gamma|\cdot\cos(\Delta\theta)\hat{a}_x+|\Delta\gamma|\sin(\Delta\theta)\hat{a}_y$$

$$-\Delta\gamma\_acc=\Delta\gamma\_acc+\Delta\gamma \quad\quad [\text{Equation 1}]$$

In Equation 1, $\Delta\theta$ represents a yaw-axis reference instantaneous angle change of the vehicle, $\Delta\theta\_acc$ represents a yaw-axis reference accumulative angle change during the period from the $(K-1)^{th}$ frame to the $K^{th}$ frame, $\Delta\gamma$ represents an instantaneous moving displacement of the vehicle, Vs represents the speed of the vehicle, dt represents a time period from the $(K-1)^{th}$ frame to the $K^{th}$ frame, represents a longitudinal unit vector, represents a horizontal unit vector, and $\Delta\gamma\_acc$ represents an accumulative moving displacement of the vehicle during the period from the $(K-1)^{th}$ frame to the $K^{th}$ frame.

The control unit 200 determines whether a grid map update condition is satisfied, according to Equation 2 below.

$$\Delta x_k = -\Delta\gamma\cdot\cos(\Delta\theta)$$

$$\Delta y_k = \Delta\gamma\cdot\sin(\Delta\theta)$$

$$\Delta x_k\_acc = \Delta x_k\_acc + \Delta x_k$$

$$\Delta y_k\_acc = \Delta y_k\_acc + \Delta y_k$$

$$\text{if } (|\Delta x_{k_{acc}}| > X_{map\_step}) \| (|\Delta y_{k_{acc}}| > Y_{map\_step}) \quad [\text{Equation 2}]$$

In Equation 2, $\Delta x_k$ represents a longitudinal instantaneous moving distance of the vehicle, $\Delta y_k$ represents a horizontal instantaneous moving distance of the vehicle, $\Delta x_k\_acc$ represents a longitudinal accumulative moving distance of the vehicle, and $\Delta y_k\_acc$ represents a horizontal accumulative moving distance of the vehicle.

When the grid map update condition is satisfied according to Equation 2, the control unit 200 updates the grid map according to Equation 3 below.

$$\begin{bmatrix} X_{map\_update}(i) \\ Y_{map\_update}(j) \end{bmatrix} = \begin{bmatrix} \cos(\Delta\theta_k) & \sin(\Delta\theta_k) \\ -\sin(\Delta\theta_k) & \cos(\Delta\theta_k) \end{bmatrix} \cdot \begin{bmatrix} X_{map}(i) \\ Y_{map}(j) \end{bmatrix} + \begin{bmatrix} \Delta x_k\_acc \\ \Delta y_k\_acc \end{bmatrix}$$

$$i\_update = \text{floor}\left(\frac{X_{map\_update}(i) - X_{map\_min}}{X_{map\_step}}\right) + 1$$

$$j\_update = \text{floor}\left(\frac{Y_{map_{update}}(j) - Y_{map\_min}}{Y_{map\_step}}\right) + 1 \quad [\text{Equation 3}]$$

In Equation 3, (i, i) represents the index of a grid, (i_update, j_update) represents the index of an updated grid, and floor represents a truncation operator. In Equation 3, the matrix functions as a rotation matrix for rotating the grid map according to the yaw rate of the vehicle:

2-3. Stationary Object Mapping

The control unit 200 may convert the location information of a stationary object, i.e. the longitudinal distance and horizontal distance to the stationary object, into an index corresponding to the (updated) grid map, according to Equation 4 below.

$$I_{tgt\_n} = \text{floor}\left(\frac{X_{tgt\_n} - X_{map\_min}}{X_{map\_step}}\right) + 1 \quad [\text{Equation 4}]$$

$$J_{tgt\_n} = \text{floor}\left(\frac{Y_{tgt\_n} - Y_{map\_min}}{Y_{map\_step}}\right) + 1$$

In Equation 4, $I_{tgt\_n}$ represents the longitudinal index of a target grid, $J_{tgt\_n}$ represents the horizontal index of the target grid, $X_{tgt\_n}$ represents the longitudinal distance to the stationary object, and $Y_{tgt\_n}$ represents the horizontal distance to the stationary object.

As illustrated in FIG. 11, the control unit 200 may map an extracted stationary object to the grid map by specifying a target grid of the grid map, corresponding to a changed index. In this case, the control unit 200 may add occupancy information having a first value to the target grid to which the stationary object is mapped, and add occupancy information having a second value to the other grids. In the present embodiment, the first value may be set to '1', and the second value may be set to '0'. Thus, the value '1' may be added as the occupancy information to the target grid to which the stationary object is mapped, and the value '0' may be added as the occupancy information to the other grids to which the stationary object is not mapped. Hereafter, the occupancy information added to an index (i, j) in the $K^{th}$ frame will be represented by Pmap (i, j, k).

3. Expanded Mapping Area Decision

As described above, the waveform, frequency, distance resolution, angle resolution, maximum sensing distance, and FoV of a radar signal transmitted from a radar sensor may have different characteristics for the respective frames, depending on the DAS (e.g. BSD, LCA or RCTA) of the vehicle, to which the radar sensor is applied. Therefore, although the same stationary object is detected, the index at which the stationary object is detected may be changed in each frame because the signal characteristics are different in each frame. In this case, an occupancy probability parameter to be described below may be reduced by the number of used signal waveforms. FIG. 12 illustrates results obtained when the radar sensor detects the same stationary object by transmitting radar signals with a single waveform and multiple waveforms. In the case of the multiple waveforms, grids occupied in the respective frames are distributed to reduce the probability that the stationary object will be detected, compared to the single waveform. When the threshold value of the grid map is set to a low value to compensate for the reduction in the occupancy probability parameter, the stationary object is highly likely to be falsely detected due to a clutter or noise.

In order to prevent the false detection, the control unit 200 in accordance with the present embodiment may add occupancy information to surrounding grids as well as the target grid corresponding to the detected stationary object. Specifically, as illustrated in FIG. 13, the control unit 200 may decide an expanded mapping area, which is expanded by a preset range on the basis of the target grid to which the stationary object is mapped, and calculate the occupancy probability parameter by adding the occupancy information with the first value to each of the grids constituting the expanded mapping area, in order to monitor the surrounding environment of the vehicle. The preset range expanded from the target grid may be defined in advance by a designer, in consideration of the similarity (distance resolution and speed resolution) between the signal waveforms.

FIG. 14 illustrates results obtained when the radar sensor detects the same stationary object by transmitting radar signals with a single waveform and multiple waveforms. After the expanded mapping area expanded by the present range from the target grid is set, the reduction in the probability that the stationary object will be detected may be removed even in the case of the multiple waveforms, through the following method of calculating the occupancy probability parameter for each of the grids constituting the expanded mapping area.

4. Occupancy Probability Parameter Calculation

The process of calculating the occupancy probability parameter of the grid map in the present embodiment follows an occupancy probability calculation method of a general OGM (Occupancy Grid Map) based on Equation 5 below.

$$l_t(i,j \mid R_{1:k}, V_{1:k}) = \log \frac{p(i,j \mid R_{1:k}, V_{1:k})}{1 - p(i,j \mid R_{1:k}, V_{1:k})} \text{ Log odd ratio} \quad \text{[Equation 5]}$$

$$l_t(i,j \mid R_{1:k}, V_{1:k}) = l_{t-1}(i,j \mid R_{1:k-1}, V_{1:k-1}) + \log \frac{p(i,j \mid R_k, V_k)}{1 - p(i,j \mid R_k, V_k)} - l_0$$

$$p(i,j \mid R_{1:k}, V_{1:k}) = 1 - \frac{1}{1 + \exp(l_t(i,j \mid R_{1:k}, V_{1:k}))}$$

In Equation 5, $R_{1:k}$ represents the sensing data (the above-described object information) of the sensor unit 100 (radar sensor) from the first frame to the $K^{th}$ frame, and $V_{1:k}$ represents the behavior data (the above-described behavior information) of the vehicle from the first frame to the $K^{th}$ frame, and I0 represents a prior probability (0 in the present embodiment).

When the occupancy information Pmap (i, j, k) added to each of the grids in the present embodiment is applied to the occupancy probability calculation method based on Equation 5 above, an occupancy probability parameter p is calculated according to Equation 6 below.

$$p(i,j \mid R_{1:k}, V_{1:k}) = \frac{1}{M} \sum_{m=k-M+1}^{k} P_{map}(i,j,m) \quad \text{[Equation 6]}$$

In Equation 6, M represents the number of frames to be monitored.

5. Grid Map Update Error Correction

The speed, moving displacement, and yaw-axis angle change of the vehicle, which serve as factors for determining whether the update condition of the grid map is satisfied, are acquired by the sensors applied to the vehicle. Since such sensing values inevitably contain an error, it may be determined that the update condition of the grid map has been satisfied even though the update condition of the grid map was not actually satisfied, due to the error contained in the sensing values. In this case, the grid map may be falsely updated. As described above, during the update process for the grid map, the control unit 200 operates to change the index of the target grid to which the stationary object is mapped. Thus, when the grid map is falsely updated, an error may occur between the index corresponding to the actual location of the stationary object and the index of the stationary object mapped to the falsely updated grid map. As a result, the error may cause false detection and missing detection for the stationary object.

The occurrence of the error will be described with reference to FIGS. 15A to 15D. FIG. 15A illustrates that a stationary object is mapped to a grid ① in the $(K-1)^{th}$ frame, and then the grid ① is expanded by a preset range to decide a first expanded mapping area, and FIG. 15B illustrates that the update condition of the above-described grid map is satisfied in the $K^{th}$ frame, such that the grid map is updated. Since the grid map has been updated, the index of the grid to which the stationary object is mapped is also changed, so that the grid to which the stationary object is mapped is updated into a grid ②. Furthermore, the location of the stationary object, which has been actually detected by the sensor unit 100, is still maintained at the grid ①. As a result, an error occurs between the index of the grid corresponding to the actual location of the stationary object and the index of the grid of the stationary object mapped to the updated grid map.

When the grid map is updated as the $(K-1)^{th}$ frame is switched to the $K^{th}$ frame, the control unit 200 may correct the respective occupancy probability parameters of the grids constituting a second expanded mapping area through a method of comparing the first expanded mapping area in the $(K-1)^{th}$ frame to the second expanded mapping area in the $K^{th}$ frame, thereby correcting the above-described update error.

Referring to FIG. 15C, the control unit 200 may specify a first area composed of grids whose occupancy probability parameters have increased, among the grids of the second expanded mapping area, on the basis of the $K^{th}$ frame over the $(K-1)^{th}$ frame. That is, the first area corresponds to grids which were not occupied in the $(K-1)^{th}$ frame, but are occupied in the $K^{th}$ frame. Furthermore, the control unit 200 may specify a second area composed of grids whose occupancy probability parameters have decreased, among the grids of the first expanded mapping area, on the basis of the $K^{th}$ frame over the $(K-1)^{th}$ frame. That is, the second area corresponds to grids which were occupied in the $(K-1)^{th}$ frame, but are not occupied in the $K^{th}$ frame. Furthermore, the control unit 200 may correct the respective occupancy probability parameters of the grids constituting the second expanded mapping area in the $K^{th}$ frame by substituting the occupancy probability parameters of the second area with the occupancy probability parameters of the first area. Thus, as illustrated in FIG. 15D, the expanded mapping area may be configured while being matched with the location of the stationary object, which is actually detected by the sensor unit 100. When the state in which the grids constituting the second area are not occupied lasts for a preset time, the occupancy probability parameters of the grids may be reset to '0'.

Figure 16A:
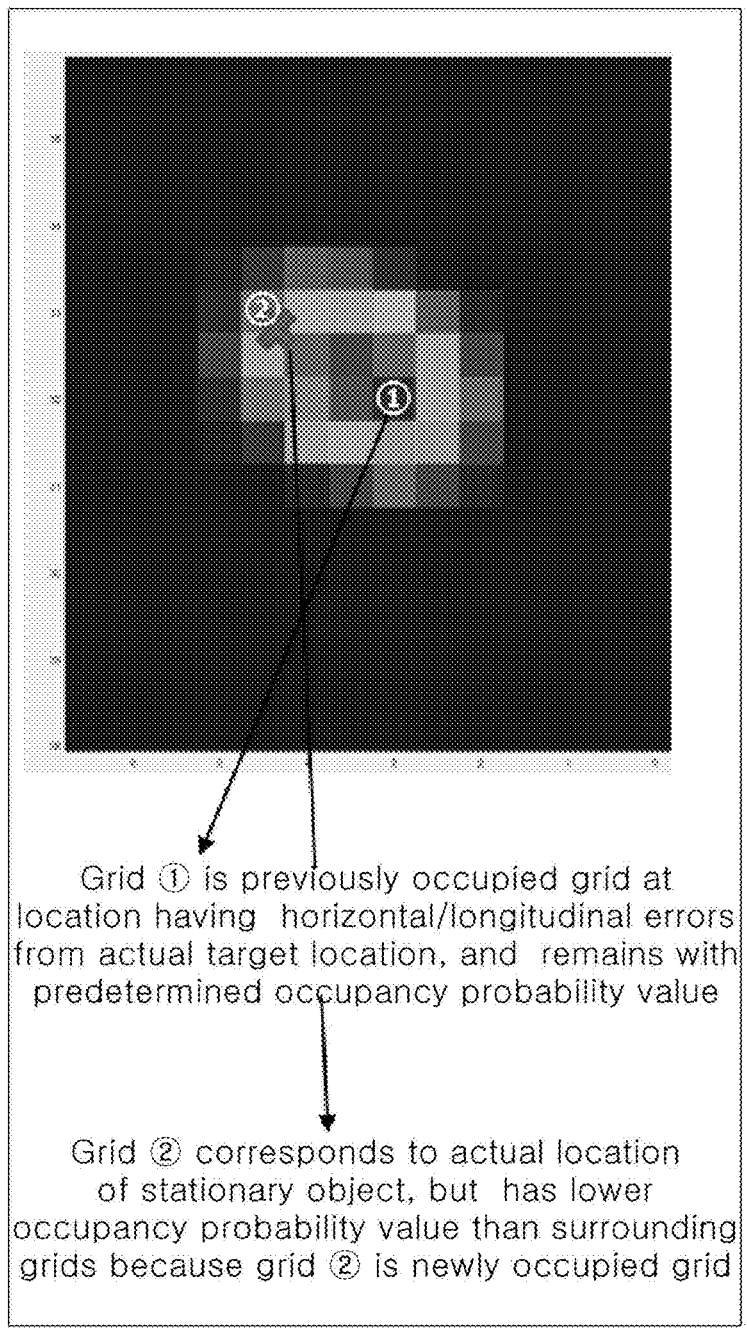

FIG. 16A illustrates an example of an occupancy probability parameter on the grid map before an update error of the grid map is updated. As described in FIG. 16A, a grid ① corresponds to a location having horizontal/longitudinal errors from the actual location of a stationary object, but remains with a predetermined occupancy probability value, and a grid ② corresponds to the actual location of the stationary object, but has a lower occupancy probability value than surrounding grids, because the grid ② is a newly occupied grid.

Figure 16B:
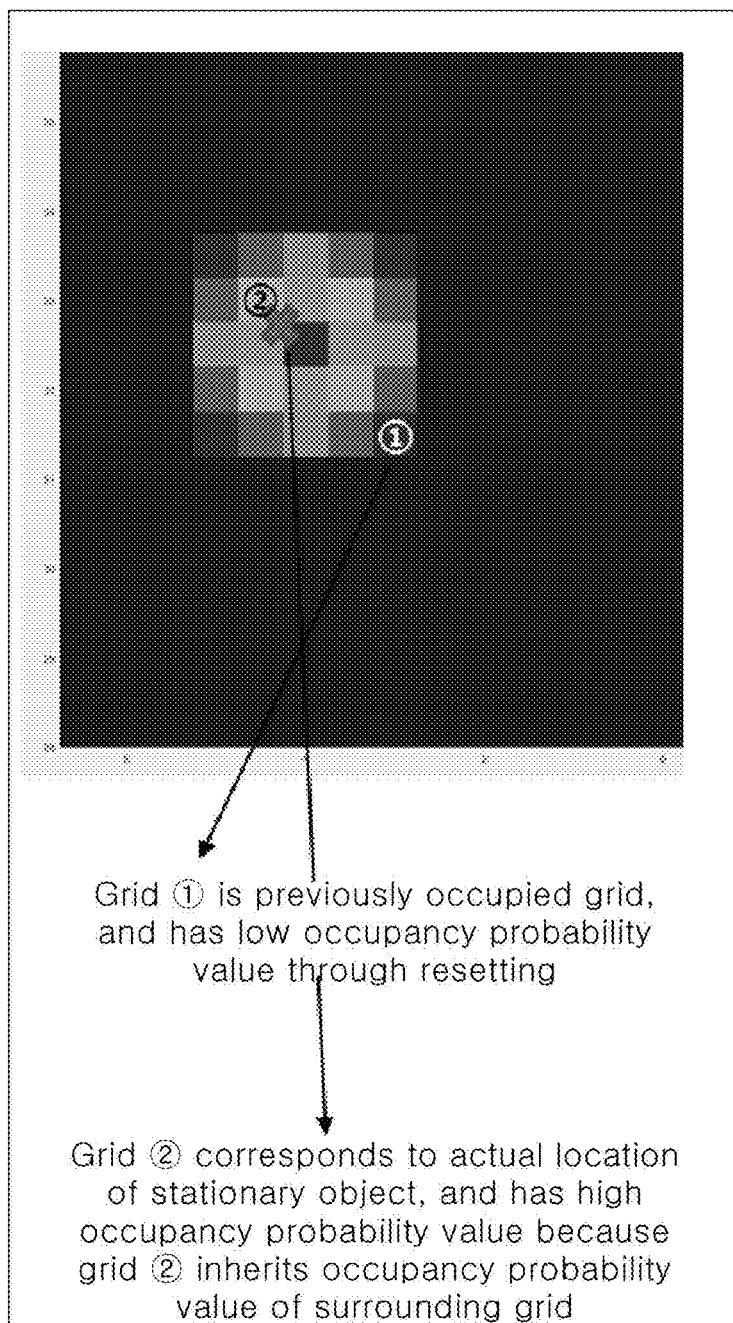

FIG. 16B illustrates an example of the occupancy probability parameter on the grid map after an update error of the grid map is corrected. As described in FIG. 16B, a grid ① is a previously occupied grid, and has a low occupancy probability value through resetting, and a grid ② corresponds to the actual location of a stationary object, and has a higher occupancy probability value than surrounding grids because the grid ② is a newly occupied grid, but inherits a predetermined occupancy probability value.

6. Correction for Shaded Area

Figure 17:
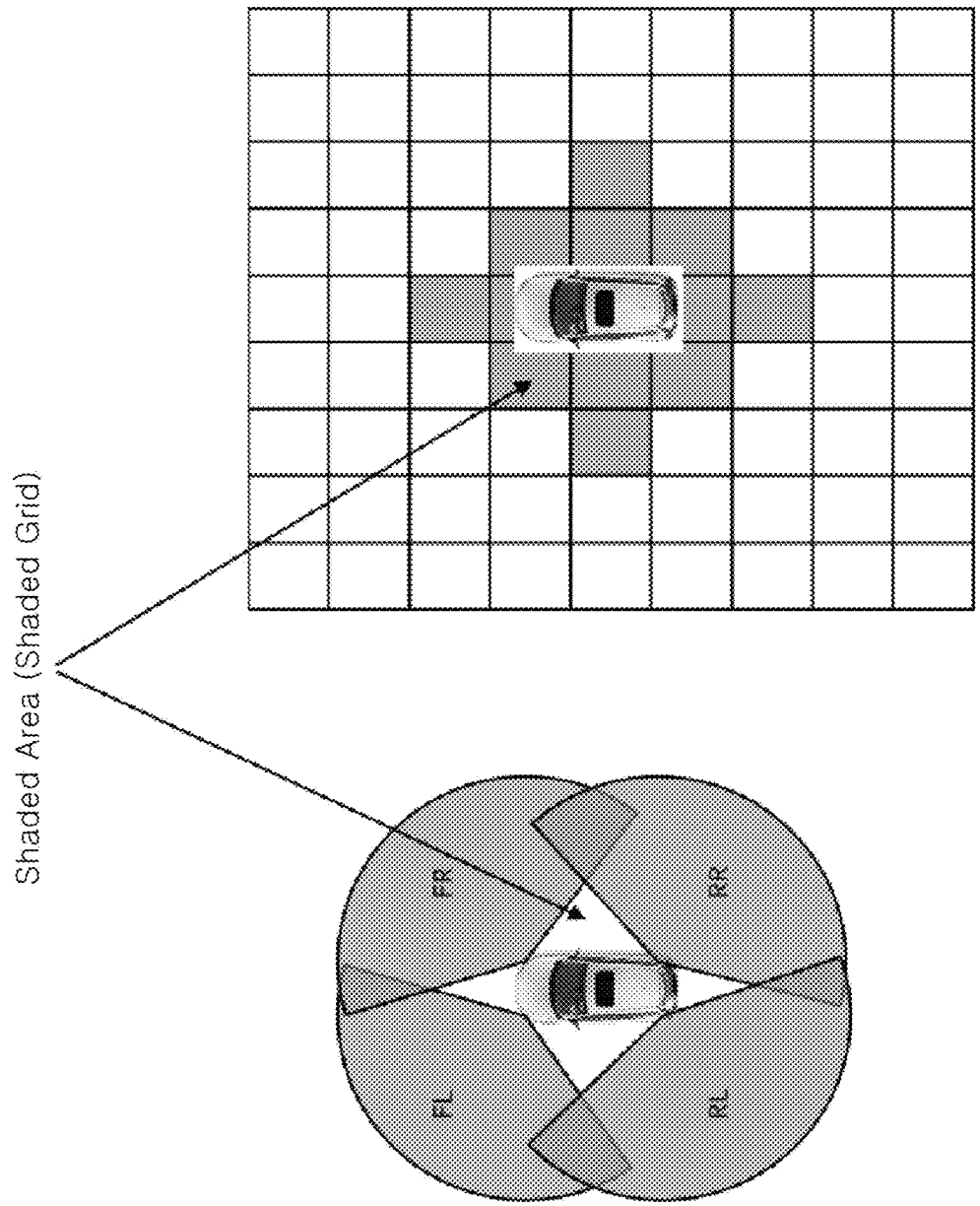

As described above, the detection sensor in accordance with the present embodiment may be implemented as a radar sensor. As illustrated in FIG. 17, a shaded area where the radar sensor cannot detect an outside object occurs due to the FoV and mounting characteristics (mounting angle and position) of the radar sensor.

In order to correct a shaded grid corresponding to the shaded area, the control unit 200 may operate to correct the shaded grid by using a first method of receiving an occupancy probability parameter in the $(K-1)^{th}$ frame or a second method of receiving an occupancy probability parameter of a grid around the shaded grid.

Figure 18:
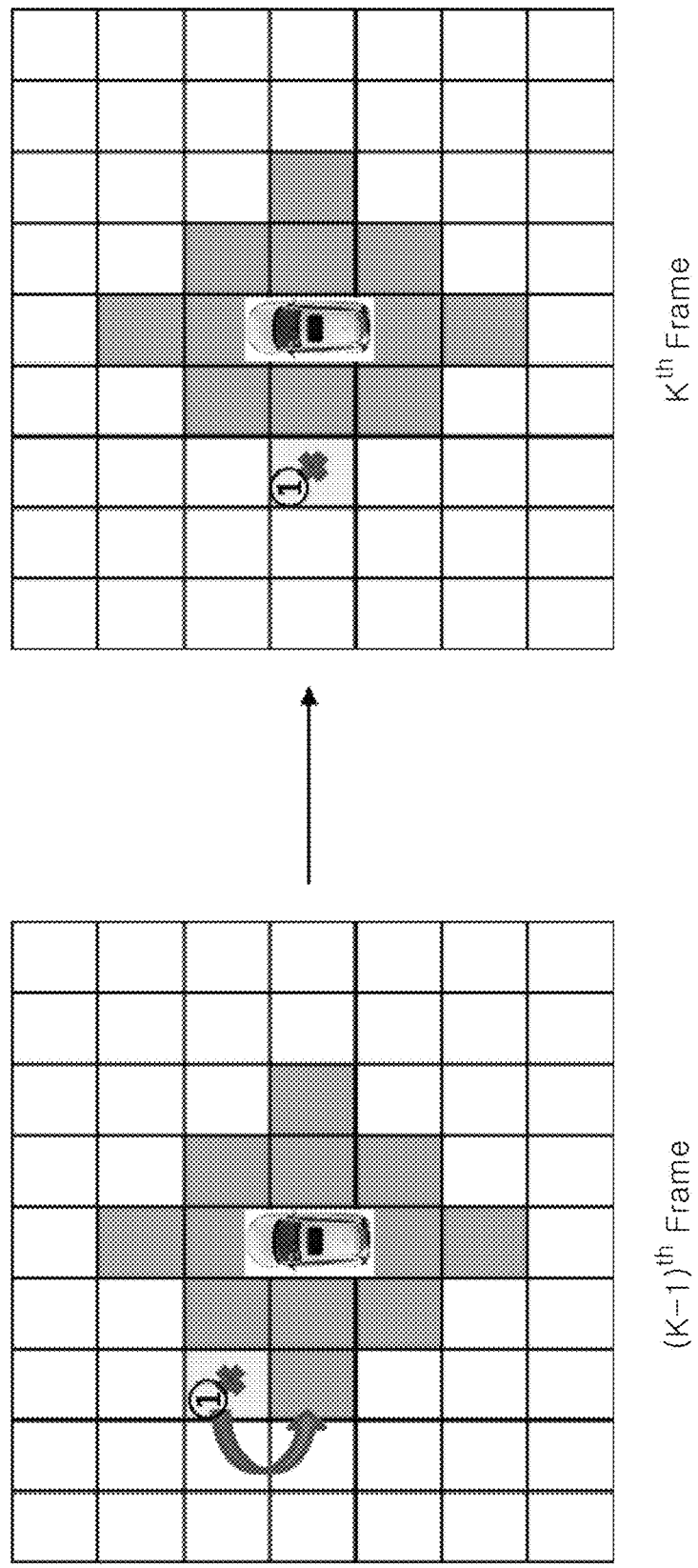

The first method may be performed when the speed of the vehicle is equal to or higher than a preset reference value. As illustrated in FIG. 18, a grid ① in the $(K-1)^{th}$ frame does not correspond to a shaded grid, and thus retains with an occupancy probability parameter. When the vehicle speed is equal to or higher than the reference value, the update process for the grid map is performed, and the grid ① in the $K^{th}$ frame belongs to the shaded grids. In this case, the control unit 200 may set the occupancy probability parameter of the grid ① in the $(K-1)^{th}$ frame to the occupancy probability parameter of the shaded grid ① in the $K^{th}$ frame, thereby minimizing a loss caused by missing detection of the radar sensor.

Figure 19:
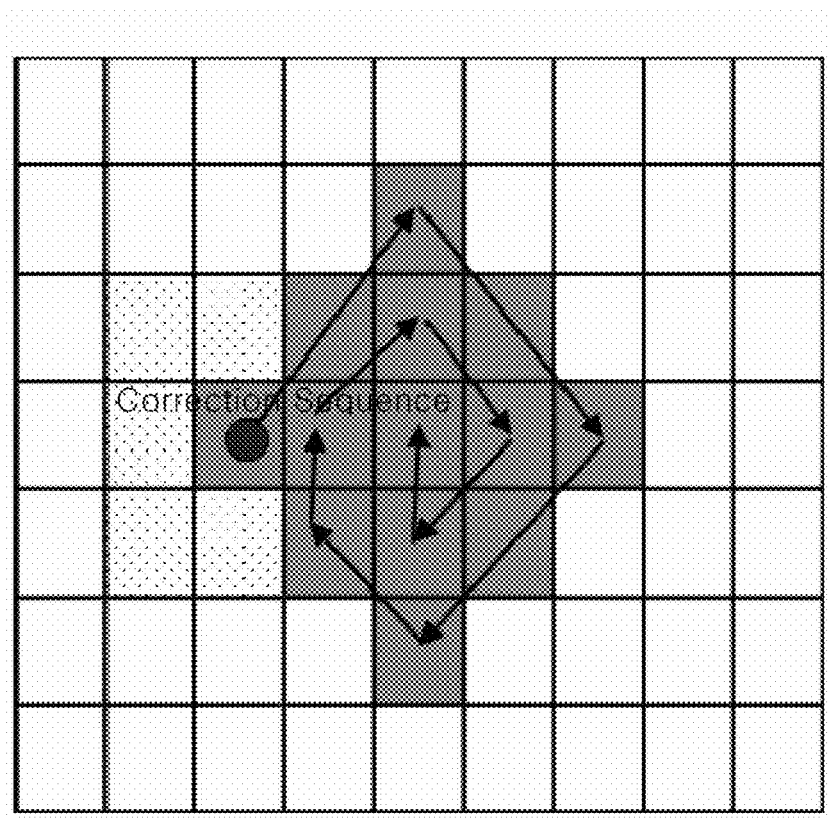

The second method may be performed when the speed of the vehicle is lower than the reference value. That is, when the vehicle travels at a very low speed or is stopped, the grid map is not updated even though the $(K-1)^{th}$ frame is switched to the $K^{th}$ frame. Thus, the first method cannot be applied. In this case, the control unit 200 may operate to set the occupancy probability parameter of a grid around a shaded grid to the occupancy probability parameter of the shaded grid. In this case, as illustrated in FIG. 19, the control unit 200 may perform the second method from a shaded grid located at the outermost position, in order to acquire the occupancy probability parameter of a grid which is not the shaded grid. The control unit 200 may set the highest occupancy probability parameter, among the occupancy probability parameters of grids located within a preset range (e.g. one grid) from the shaded grid, to the occupancy probability parameter of the corresponding shaded grid. FIGS. 20A and 20B show a result obtained by setting an occupancy probability parameter with a predetermined value to a shaded grid through the correction for the shaded area.

7. Stationary Object Location Decision (Peak Detection)

When the update of the grid map, the decision of the expanded mapping area, the update error correction, and the shaded area correction are performed through the above-described processes, the control unit 200 may operate to specify the grid at which the stationary object is highly likely to be located, on the basis of the occupancy probability parameters of the grids within the expanded mapping area.

That is, the control unit 200 may decide a peak grid having the highest occupancy probability parameter among the grids within the expanded mapping area decided for a plurality of frames to be monitored. When the occupancy probability parameter of the peak grid is equal to or larger than a threshold value defined for the peak grid, the control unit 200 may determine that the stationary object is located at the peak grid. The control unit 200 may monitor the surrounding environment of the vehicle by repeatedly performing the stationary object location decision method based on the 'peak detection', while the vehicle travels.

Figure 21:
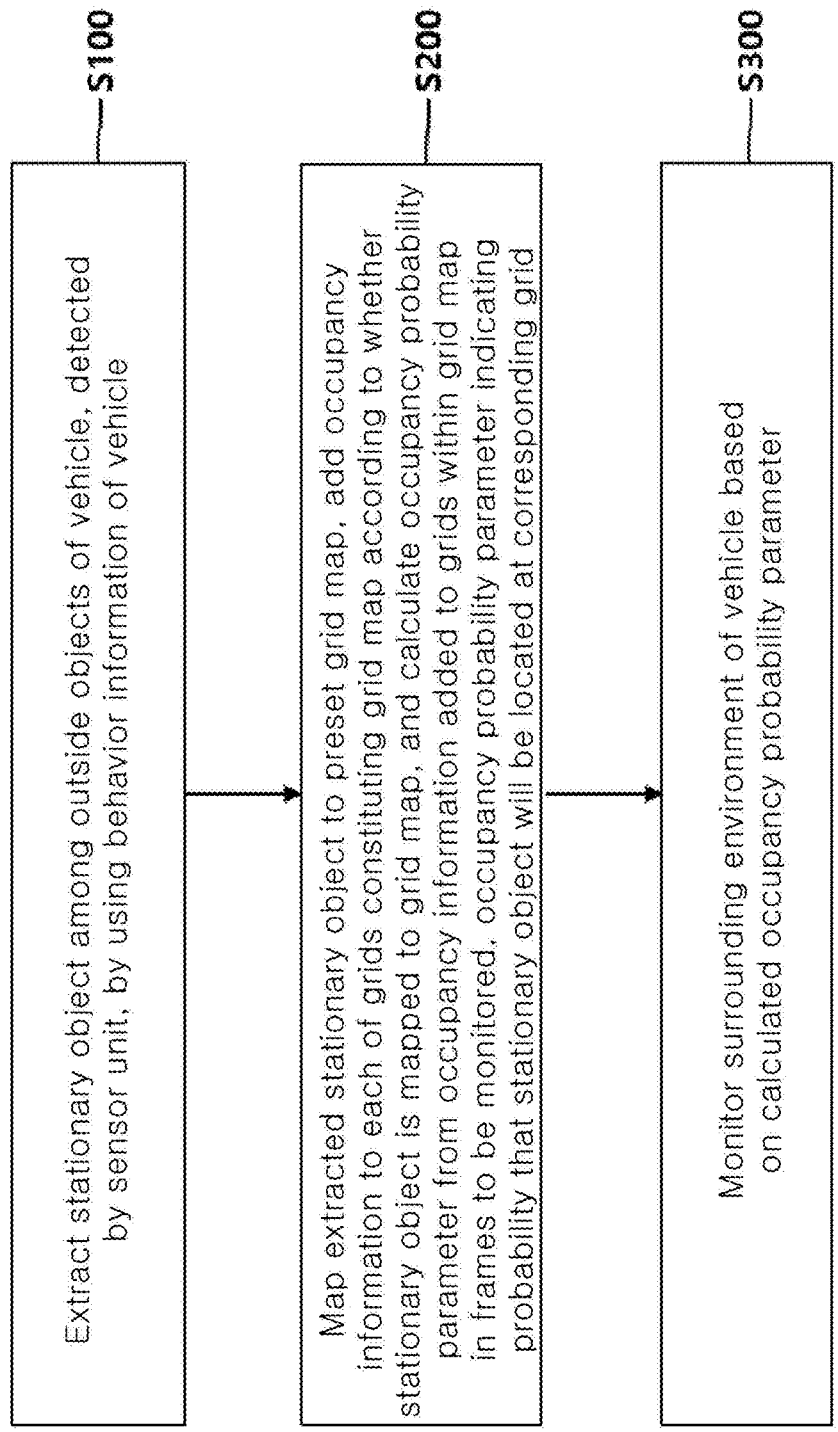
FIG. 21 is a flowchart illustrating a method for monitoring the surrounding environment of a vehicle in accordance with an embodiment of the present disclosure.

FIG. 21 is a flowchart for describing a method for monitoring the surrounding environment of a vehicle in accordance with an embodiment of the present disclosure. The method for monitoring the surrounding environment of a vehicle in accordance with the present embodiment will be described with reference to FIG. 21. Hereafter, the descriptions of contents overlapping the above-described contents will be omitted herein, and the following descriptions will be focused on a time series configuration.

First, the control unit 200 extracts a stationary object among objects outside the vehicle, detected by the sensor unit 100, by using the behavior information of the vehicle, in step S100.

Then, the control unit 200 maps the stationary object extracted in step S100 to a preset grid map, adds occupancy information to each of grids constituting the grid map according to whether the stationary object is mapped to the grid map, and calculates an occupancy probability parameter from the occupancy information added to the grids within the grid map in a plurality of frames to be monitored, the occupancy probability parameter indicating the probability that the stationary object will be located at the corresponding grid, in step S200.

In step S200, the control unit 200 maps the stationary object to the grid map while updating the grid map by changing the respective indexes of the grids constituting the grid map according to the behavior information of the vehicle.

Furthermore, in step S200, the control unit 200 converts the location information of the stationary object into an index corresponding to the grid map, maps the stationary object to the grid map by specifying a target grid of the grid map, corresponding to the index, adds occupancy information with a first value to the target grid to which the stationary object is mapped, and adds occupancy information with a second value to the other grids, the second value being smaller than the first value.

Furthermore, in step S200, the control unit 200 calculates an occupancy probability parameter by deciding an expanded mapping area expanded by a preset range on the basis of the target grid to which the stationary object is mapped, and adding the occupancy information with the first value to each of grids constituting the expanded mapping area.

Furthermore, in step S200, the control unit 200 corrects the occupancy probability parameters of grids constituting a second expanded mapping area by comparing a first expanded mapping area in the $(K-1)^{th}$ frame to the second expanded mapping area in the $K^{th}$ frame, when the grid map is updated as the $(K-1)^{th}$ frame is switched to the $K^{th}$ frame. Specifically, the control unit 200 specifies a first area composed of grids whose occupancy probability parameters have increased, among the grids of the second expanded mapping area, and a second area composed of grids whose occupancy probability parameters have decreased, among the grids of the first expanded mapping area, on the basis of the $K^{th}$ frame over the $(K-1)^{th}$ frame. Then, the control unit 200 corrects the respective occupancy probability parameters of the grids constituting the second expanded mapping area in the $K^{th}$ frame by substituting the occupancy probability parameters of the second area with the occupancy probability parameters of the first area.

Furthermore, in step S200, the control unit 200 corrects a shaded grid corresponding to a shaded area where the sensor unit 100 cannot detect an outside object in the $K^{th}$ frame, by using a first method of receiving an occupancy probability parameter in the $(K-1)^{th}$ frame or a second method of receiving an occupancy probability parameter of a grid around the shaded grid. In this case, the control unit 200 corrects the shaded grid according to the first method when the speed of the vehicle is equal to or higher than a preset reference value, and corrects the shaded grid according to the second method when the speed of the vehicle is lower than the reference value.

After step S200, the control unit 200 monitors the surrounding environment of the vehicle on the basis of the occupancy probability parameter calculated in step S200, in step S300. Specifically, the control unit 200 decides a peak grid having the highest occupancy probability parameter among the grids within the expanded mapping area decided for a plurality of frames to be monitored. When the occupancy probability parameter of the peak grid is equal to or larger than a threshold value defined for the peak grid, the control unit 200 determines that the stationary object is located at the peak grid.

As such, the apparatus and method for monitoring the surrounding environment of a vehicle in accordance with the present embodiment may map a stationary object detected through the radar to the preset grid map, add occupancy information to each of the grids constituting the grid map depending on whether the stationary object is mapped to the grid map, and then calculate the occupancy probability parameter from the occupancy information added to each of the grids within the grid map in a plurality of frames to be monitored, the occupancy probability parameter indicating that the probability that the stationary object will be located at the corresponding grid, in order to monitor the surrounding environment of the vehicle. Thus, the apparatus and method can improve the detection accuracy for the outside object when monitoring the surrounding environment of the vehicle through the radar.

The embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device. The processor also includes a communication device, such as a computer, cellular phone, PDA (Personal Digital Assistant) and another device, which facilitates information communication between end users.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for monitoring surrounding environment of a vehicle, comprising:
   a sensor unit comprising a plurality of detection sensors configured to detect an object outside the vehicle according to frames with a predefined period; and
   a control unit configured to:
      extract a stationary object among outside objects detected through the sensor unit by using behavior information of the vehicle,
      map the extracted stationary object to a preset grid map,
      add occupancy information to each of grids constituting the grid map depending on whether the stationary object is mapped to the grid map,
      calculate an occupancy probability parameter indicating a probability that the stationary object will be located at each of the grids from the occupancy information added to the grids within the grid map in a plurality of frames to be monitored, and
      monitor the surrounding environment of the vehicle on a basis of the calculated occupancy probability parameter,
   wherein the grid map has a threshold value defined for each of the grids on a basis of a mathematical model according to an intensity of a received signal inputted to the sensor unit, the threshold value is compared to the calculated occupancy probability parameter, and the threshold value is a reference value to decide whether the stationary object occupies each of the grids within the grid map.

2. The apparatus of claim 1, wherein the threshold value has different values for an independent area, a single-overlap area, and a multi-overlap area within the grid map,
   wherein the independent area is an area within the grid map, sensed by a first detection sensor in a $K^{th}$ frame, where K is a natural number,
   the single-overlap area is an area within the grid map, where an area sensed by the first detection sensor and the independent area overlap each other in a $(K+1)^{th}$ frame distinguished from the $K^{th}$ frame, and
   the multi-overlap area is an area within the grid map, where an area sensed by a second detection sensor adjacent to the first detection sensor and the single-overlap area overlap each other in the $K^{th}$ frame or the $(K+1)^{th}$ frame.

3. The apparatus of claim 1, wherein the grid map comprises a longitudinal axis, a horizontal axis, and indexes, which are set on a basis of the vehicle, and
   the control unit is further configured to map the extracted stationary object to the grid map while updating the grid map by changing respective indexes of the grids constituting the grid map according to the behavior information of the vehicle.

4. The apparatus of claim 3, wherein the control unit is further configured to:
   update the grid map when a longitudinal moving distance of the vehicle is larger than a longitudinal size of the grid or a horizontal moving distance of the vehicle is larger than a horizontal size of the grid, during a period from a $(K-1)^{th}$ frame to the $K^{th}$ frame, and
   change the respective indexes of the grids in the $(K-1)^{th}$ frame from those in the $K^{th}$ frame, on a basis of the longitudinal moving distance, the horizontal moving distance, and a longitudinal angle change of the vehicle.

5. The apparatus of claim 3, wherein the control unit is further configured to:
   convert location information of the extracted stationary object into an index corresponding to the grid map,
   map the extracted stationary object to the grid map by specifying a target grid on the grid map corresponding to the index,
   add a first occupancy information with a first value to the target grid to which the stationary object is mapped, and
   add a second occupancy information with a second value to the other grids, the second value being smaller than the first value.

6. The apparatus of claim 5, wherein the control unit is further configured to:
   decide an expanded mapping area which is expanded by a preset range on a basis of the target grid to which the stationary object is mapped, and
   calculate the occupancy probability parameter by adding the first occupancy information with the first value to each of grids constituting the expanded mapping area, in order to monitor the surrounding environment of the vehicle.

7. The apparatus of claim 6, wherein when the grid map is updated as the $(K-1)^{th}$ frame is switched to the $K^{th}$ frame, the control unit is further configured to correct respective occupancy probability parameters of grids constituting a second expanded mapping area by comparing a first expanded mapping area in the $(K-1)^{th}$ frame to the second expanded mapping area in the $K^{th}$ frame.

8. The apparatus of claim 7, wherein the control unit is further configured to:
   specify, among the grids of the second expanded mapping area, a first area composed of grids whose occupancy probability parameters has increased in the $K^{th}$ frame over the $(K-1)^{th}$ frame,
   specify, among the grids of the first expanded mapping area, a second area composed of grids whose occupancy probability parameters has decreased in the $K^{th}$ frame over the $(K-1)^{th}$ frame, and then
   correct the respective occupancy probability parameters of the grids constituting the second expanded mapping area in the $K^{th}$ frame by substituting the occupancy probability parameters of the second area with the occupancy probability parameters of the first area.

9. The apparatus of claim 6, wherein the control unit is further configured to:
   decide a peak grid having the highest occupancy probability parameter among the grids within the expanded mapping area decided for the plurality of frames to be monitored, and
   determine that the stationary object is located at the peak grid, when the occupancy probability parameter of the peak grid is equal to or larger than a threshold value defined for the peak grid.

10. The apparatus of claim 1, wherein the control unit is further configured to correct a shaded grid corresponding to a shaded area where the sensor unit is not able to detect an outside object in a $K^{th}$ frame, by using a first method of receiving the occupancy probability parameter of a grid in a $(K-1)^{th}$ frame corresponding to the shaded grid or a second method of receiving the occupancy probability parameter of a grid around the shaded grid.

11. The apparatus of claim 10, wherein the control unit is configured to correct the shaded grid according to the first method when the speed of the vehicle is equal to or higher than a preset reference value, and corrects the shaded grid according to the second method when the speed of the vehicle is lower than the reference value.

12. A method for monitoring surrounding environment of a vehicle, comprising:
   extracting, by a control unit, a stationary object among objects outside the vehicle detected by a sensor unit, by using behavior information of a vehicle, wherein the sensor unit comprises a plurality of detection sensors for detecting the objects outside the vehicle according to frames with a preset period;
   mapping, by the control unit, the extracted stationary object to a preset grid map, adding, by the control unit, occupancy information to each of grids constituting the grid map depending on whether the extracted stationary object is mapped to the grid map, and calculating, by the control unit, an occupancy probability parameter indicating a probability that the stationary object will be located at each of the grids from the occupancy information added to the grids within the grid map in a plurality of frames to be monitored; and
   monitoring, by the control unit, the surrounding environment of the vehicle on a basis of the calculated occupancy probability parameter,
   wherein the grid map has a threshold value defined for each of the grids on a basis of a mathematical model according to an intensity of a received signal inputted to the sensor unit, the threshold value is compared to the calculated occupancy probability parameter, and the threshold value is a reference value to decide whether the stationary object occupies each of the grids within the grid map.

13. The method of claim 12, wherein the grid map comprises a longitudinal axis, a horizontal axis, and indexes, which are set on a basis of the vehicle, wherein the calculating of the occupancy probability parameter includes mapping, by the control unit, the extracted stationary object to the grid map while updating, by the control unit, the grid map by changing respective indexes of the grids constituting the grid map according to the behavior information of the vehicle.

14. The method of claim 13, wherein the calculating of the occupancy probability parameter further includes converting, by the control unit, location information of the extracted stationary object into an index corresponding to the grid map, mapping, by the control unit, the extracted stationary object to the grid map by specifying a target grid on the grid map, corresponding to the index, adding, by the control unit, a first occupancy information with a first value to the target grid to which the stationary object is mapped, and adding, by the control unit, a second occupancy information with a second value to the other grids, the second value being smaller than the first value.

15. The method of claim 14, wherein the calculating of the occupancy probability parameter further includes deciding, by the control unit, an expanded mapping area which is expanded by a preset range on a basis of the target grid to which the stationary object is mapped, and calculating, by the control unit, the occupancy probability parameter by adding the first occupancy information with the first value to each of grids constituting the expanded mapping area, in order to monitor the surrounding environment of the vehicle.

16. The method of claim 15, wherein the calculating of the occupancy probability parameter further includes, when the grid map is updated as a $(K-1)^{th}$ frame is switched to a $K^{th}$ frame or when the index of the target grid to which the stationary object is mapped is not changed, correcting, by the control unit, respective occupancy probability parameters of grids constituting a second expanded mapping area by comparing a first expanded mapping area in the $(K-1)^{th}$ frame to the second expanded mapping area in the $K^{th}$ frame.

17. The method of claim 15, wherein the monitoring of the surrounding environment of the vehicle includes deciding, by the control unit, a peak grid having the highest occupancy probability parameter among the grids within the expanded mapping area decided for the plurality of frames to be monitored, and determining, by the control unit, that the stationary object is located at the peak grid, when the occupancy probability parameter of the peak grid is equal to or larger than a threshold value defined for the peak grid.

18. The method of claim 12, wherein the calculating of the occupancy probability parameter includes correcting, by the control unit, a shaded grid corresponding to a shaded area where the sensor unit is not able to detect an outside object in a $K^{th}$ frame, by using a first method of receiving the occupancy probability parameter of a grid in a $(K-1)^{th}$ frame corresponding to the shaded grid or a second method of receiving the occupancy probability parameter of a grid around the shaded grid.

* * * * *